US012688653B1

(12) United States Patent
Joy et al.

(10) Patent No.: US 12,688,653 B1
(45) Date of Patent: Jul. 21, 2026

(54) SYSTEM AND METHOD OF GENERATING MESH REPRESENTING FLOW DOMAIN

(71) Applicant: ANSYS, INC., Canonsburg, PA (US)

(72) Inventors: Jimin Joy, North York (CA);
Alexander Cohen, Montreal (CA);
Gregg Streuber, New Hamburg (CA);
Zeljko Lilek, Waterloo (CA)

(73) Assignee: ANSYS, INC., Canonsburg, PA (US)

( * ) Notice: Subject to any disclaimer, the term of this patent is extended or adjusted under 35 U.S.C. 154(b) by 235 days.

(21) Appl. No.: 18/740,428

(22) Filed: Jun. 11, 2024

(51) Int. Cl.
*G06T 17/20* (2006.01)

(52) U.S. Cl.
CPC .................................. *G06T 17/205* (2013.01)

(58) Field of Classification Search
None
See application file for complete search history.

(56) References Cited

U.S. PATENT DOCUMENTS

2017/0017741 A1* 1/2017 Lim ........................ G06T 17/20

OTHER PUBLICATIONS

Pantel et al., "Assessment of Reynolds-Averaged Navier-Stokes/ Blade Element Theory Body Force Method for Propeller Modeling", Feb. 2024. (Year: 2024).*

Kainz, M, Kau, H, & Le Chuiton, F. "Near-Field Noise Reduction of a Ducted Helicopter Tail Rotor due to a Modified Stator Vane Geometry." Proceedings of the ASME Turbo Expo 2012: Turbine Technical Conference and Exposition. vol. 8: Turbomachinery, Parts A, B, and C. Copenhagen, Denmark. Jun. 11-15, 2012. pp. 1757-1768. ASME. https://doi.org/10.1115/GT2012-69118.

White, J. Elliptic grid generation with orthogonality and spacing control on an arbitrary No. of boundaries, AIAA 21st Fluid Dynamics, Plasma Dynamics and Lasers Conference, Jun. 18, 1990-Jun. 20, 1990, Seattle, WA, 12 pages https://doi.org/10.2514/6.1990-1568.

Yaoxin Zhang, Yafei Jia, Sam S. Y. Wang. 2D nearly orthogonal mesh generation, Int. J. Numer. Meth. Fluids 2004; 46:685-707 Published online Sep. 6, 2004 in Wiley InterScience (www.interscience. wiley.com). DOI: 10.1002/fld.770.

* cited by examiner

*Primary Examiner* — Nicholas R Wilson
(74) *Attorney, Agent, or Firm* — WOMBLE BOND DICKINSON (US) LLP

(57) ABSTRACT

A system and method generates a mesh representing a flow domain around a surface of a physical object. The system receives an initial mesh representing the flow domain. The initial mesh has a corner vertex corresponding to a corner grid point of a grid in a parameterized space. The system updates the corner grid point to obtain an updated grid in the parameterized space according to angles formed by boundary edges and a border edge of the initial mesh. The system determines an updated mesh from the initial mesh according to the updated grid to reduce a difference between the angles formed by the boundary edges and the border edge. The system generates the mesh representing the flow domain for simulating a physical characteristic of the physical object.

20 Claims, 15 Drawing Sheets

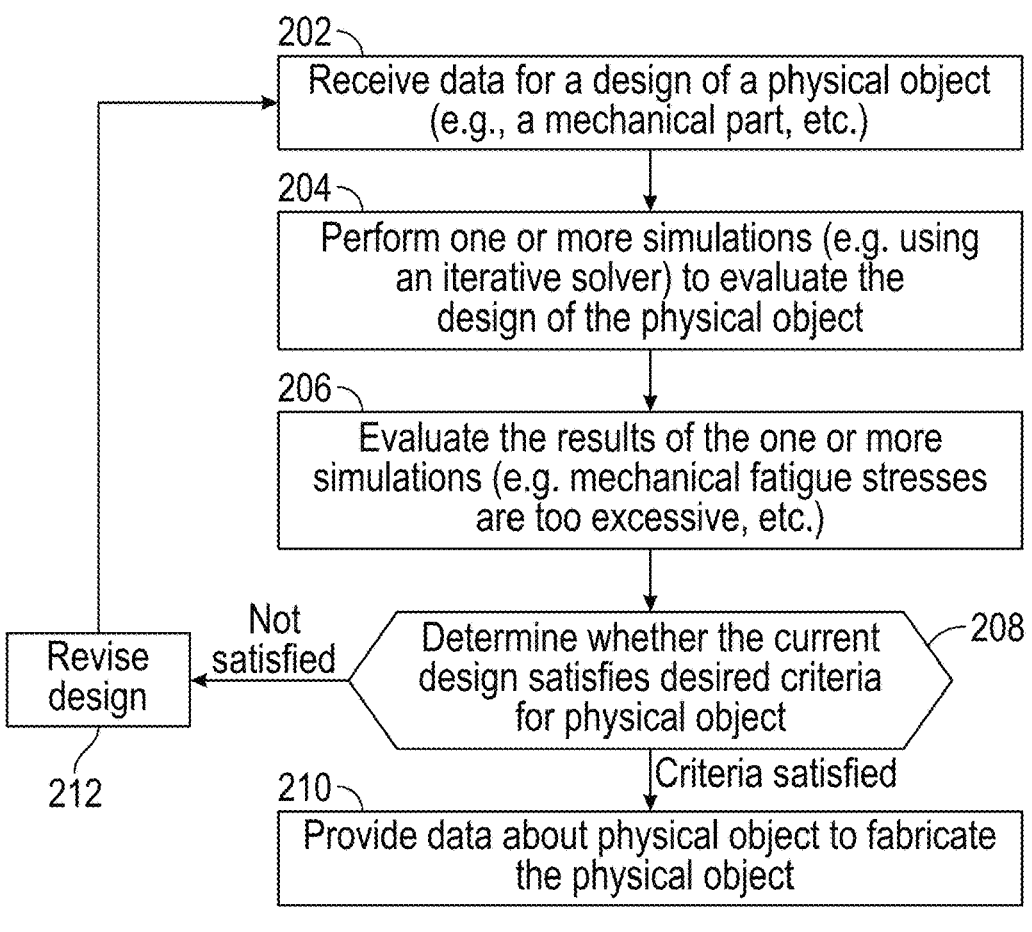

202
Receive data for a design of a physical object
(e.g., a mechanical part, etc.)

204
Perform one or more simulations (e.g. using
an iterative solver) to evaluate the
design of the physical object 206
Evaluate the results of the one or more
simulations (e.g. mechanical fatigue stresses
are too excessive, etc.)

208
Determine whether the current
design satisfies desired criteria
for physical object Not satisfied Revise design

212

Criteria satisfied

210
Provide data about physical object to fabricate
the physical object

FIG. 2

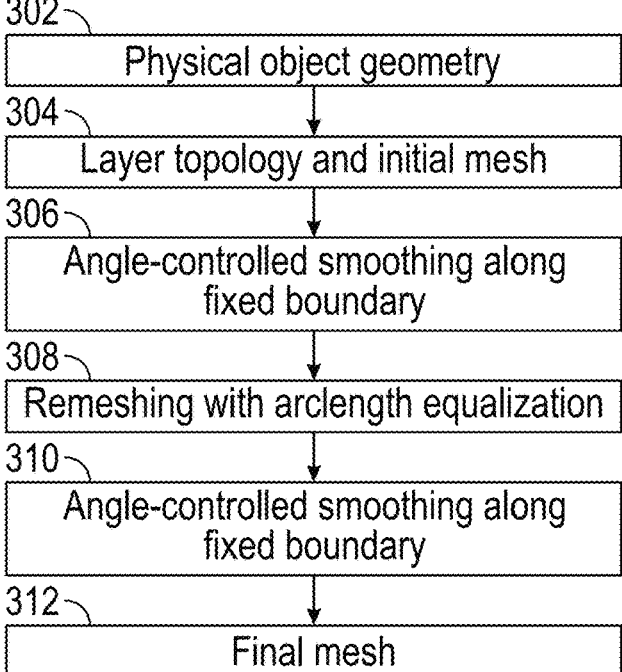

302
Physical object geometry

304
Layer topology and initial mesh

306
Angle-controlled smoothing along
fixed boundary

308
Remeshing with arclength equalization

310
Angle-controlled smoothing along
fixed boundary

312
Final mesh

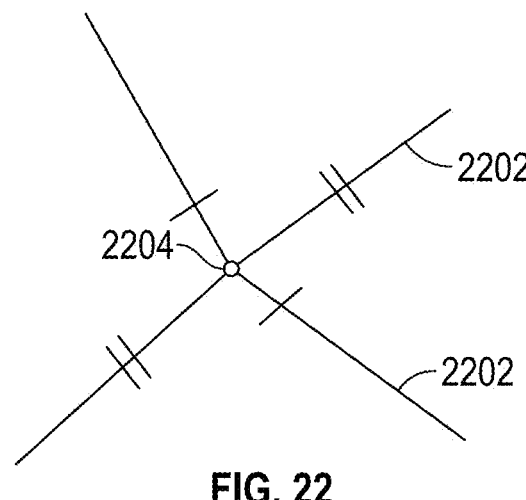
FIG. 22
FIG. 23
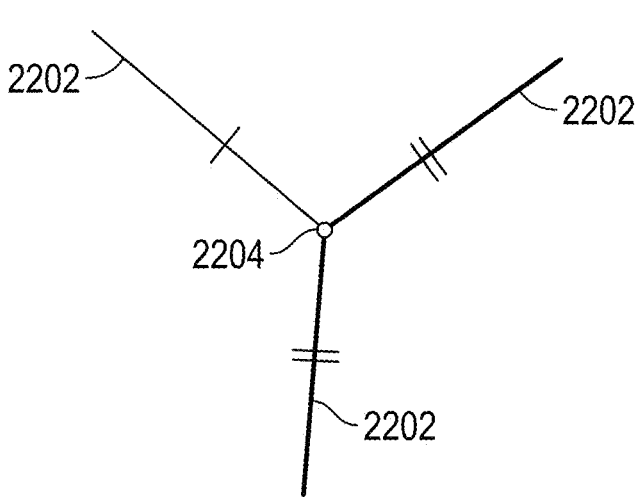
FIG. 24

2700

2800

SYSTEM AND METHOD OF GENERATING MESH REPRESENTING FLOW DOMAIN

BACKGROUND

Field

The present disclosure relates to methods and systems of modeling flow domains. More specifically, the present disclosure relates to methods and systems of generating a mesh model of a flow domain to simulate a physical characteristic of a physical object.

Background Information

Computer-aided design (CAD) and computer graphics can model fluid flow around a physical object. For example, fluid flow around a hydromachinery turbine blade can be modeled for simulating a physical characteristic of the turbine blade. Modeling fluid flow involves the generation of meshes representing a flow domain around the physical object. For example, multi-block mesh generation with smoothing may be used to generate meshes representing the flow domain. Angle-based or elliptic smoothing has been used for multi-block mesh generation of some 2D and 3D flow domains, such as flow domains around hydro turbine blades having rounded trailing edges.

SUMMARY

Hydromachinery turbine blade with square trailing edges, such as Kaplan or Francis turbine blades, pose a challenge for existing mesh generation techniques. Such techniques rely on smoothing a mesh with mesh points on a boundary freely sliding. While the sliding on boundary technique works well for flow domains with smooth boundaries, e.g., blades having rounded trailing edges, square trailing edges have sharp features such as corner points that disrupt the mesh point sliding and causes unacceptable mesh results. More particularly, smoothing with sliding on the boundary can result in a mesh with poor continuity and poor mesh angle quality.

In view of the shortcomings of existing methods, it will be appreciated that there is a need for a method of generating flow domain representations that can accurately represent flow around a surface having a square trailing edge by a mesh having superior continuity and good overall mesh angle quality. A method and system of generating a mesh representation of a flow domain is provided below, which meets that need.

In an embodiment, the system has memory and one or more processors to execute instructions stored on a non-transitory computer-readable medium to cause the system to perform a method. The method includes receiving an initial mesh representing a flow domain around a surface of a physical object. The initial mesh has a block mesh for a corner of the surface. The block mesh includes a corner vertex, two boundary vertices, and a border vertex along outer edges of the block mesh. Boundary edges of the outer edges connect the two boundary vertices to the corner vertex for boundaries of the flow domain around the corner of the surface. A border edge connects the corner vertex to the border vertex. The initial mesh corresponds to a grid in a parameterized space according to a mapping relationship. The corner vertex of the initial mesh corresponds to a corner grid point of the grid. The method includes updating the corner grid point to obtain an updated grid in the parameterized space according to angles formed by the boundary edges and the border edge. The updated grid being obtained by maintaining fixed in the parameterized space other grid points corresponding to vertices along the outer edges of the block mesh. The method includes determining an updated mesh from the initial mesh according to the updated grid and the mapping relationship to reduce a difference between the angles formed by the boundary edges and the border edge. The method includes generating a final mesh representing the flow domain for simulating a physical characteristic of the physical object.

The above summary does not include an exhaustive list of all aspects of the present invention. It is contemplated that the invention includes all devices, systems, and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIG. 2 is a flowchart of a method of generating a design of a physical object, in accordance with an embodiment.

FIG. 3 is a flowchart of a method of generating a mesh representing a flow domain around a surface of a physical object, in accordance with an embodiment.

FIGS. 22-24 are pictorial views of arclength equalization stencils, in accordance with an embodiment.

DETAILED DESCRIPTION

Embodiments describe a system and method of generating a mesh representing a flow domain using a boundary angle-controlled elliptic smoothing approach. The flow domain can be around a surface of a physical object, such as a hydromachinery turbine blade. The system and method can be embodied as software running on a server-oriented system or a standalone computer.

In various embodiments, description is made with reference to the figures. However, certain embodiments may be practiced without one or more of these specific details, or in combination with other known methods and configurations. In the following description, numerous specific details are set forth, such as specific configurations, dimensions, and processes, in order to provide a thorough understanding of the embodiments. In other instances, well-known processes and manufacturing techniques have not been described in particular detail in order to not unnecessarily obscure the description. Reference throughout this specification to "one embodiment," "an embodiment," or the like, means that a particular feature, structure, configuration, or characteristic described is included in at least one embodiment. Thus, the appearance of the phrase "one embodiment," "an embodiment," or the like, in various places throughout this specification are not necessarily referring to the same embodiment. Furthermore, the particular features, structures, configurations, or characteristics may be combined in any suitable manner in one or more embodiments.

The use of relative terms throughout the description may denote a relative position or direction. For example, "above," "forward," etc. may indicate a first direction in a referential space. Similarly, "below," "backward," etc. may indicate a second direction in an opposite direction from the direction. Such terms are provided to establish relative frames of reference, however, and are not intended to limit the methods or systems to a specific configuration described in the various embodiments below.

In an aspect, a system and method generates a mesh representing a flow domain around a surface of a physical object using a boundary angle-controlled elliptic smoothing approach. For example, the method and system can generate a mesh for a flow domain around a hydromachinery turbine blade having a square trailing edge. The smoothing approach can be used on a 2D quad mesh having fixed points on a boundary that preserves feature angles for the mesh along the boundary. The angle controlled smoothing approach can be performed as a post-processing after each of several iterative remeshing operations to produce the mesh having superior continuity and good overall mesh angle quality. Accordingly, the generated mesh can be used for design, e.g., computer-aided design, and/or analysis, e.g., computational fluid dynamics analysis, of the physical object, e.g., the hydromachinery turbine blade.

Figure 1:
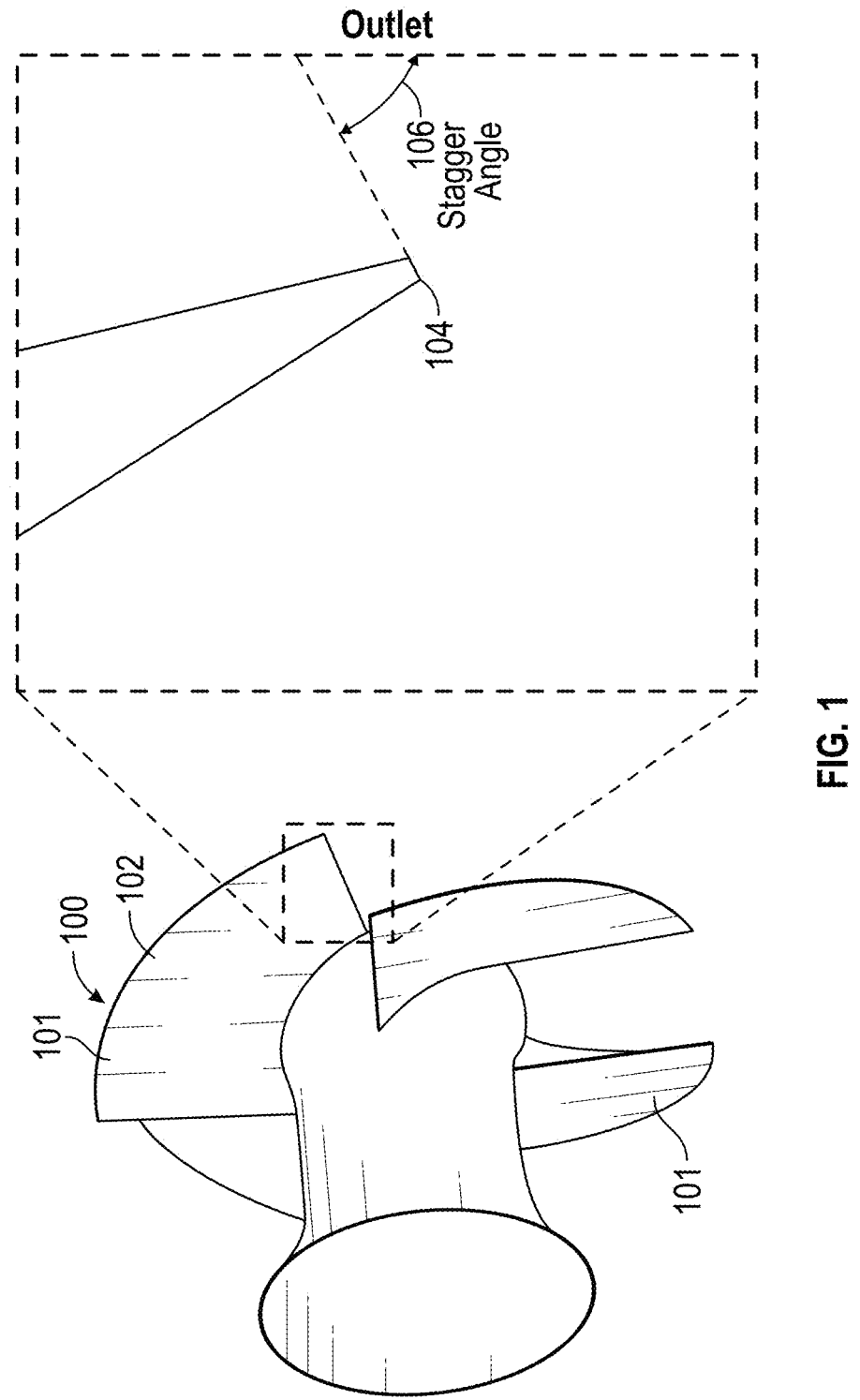
FIG. 1 is a perspective view of a physical object, in accordance with an embodiment.

Referring to FIG. 1, a perspective view of a physical object is shown in accordance with an embodiment. A physical object 100 can be something material, such as a part or component of a device or a machine. The physical object 100 may be, for example, hydromachinery such as a turbine having several blades 101. In an embodiment, the physical object has a surface 102. For example, the surface 102 can be a geometry of one or more of the blades 101 that move through a fluid when driving a vessel forward.

The blades 101 can have square trailing edges and/or higher stagger angles. For example, the physical object 100 can include a Kaplan or a Francis turbine blade having a square trailing edge including a corner 104. The square trailing edge can be a cut-off end of the blade profile where the cutting line is not aligned with an outlet curve. A stagger angle 106 can be defined for the blade profile. The stagger angle 106 is an angle of tilt of the blade profile from a horizontal axis extending through the physical object, e.g., an axis of rotational symmetry of the blades, between an inlet and an outlet. The stagger angle 106 may be at any height of the blade between a radially inward edge, e.g., at a hub of a turbine, and a radially outward edge of the blade. In an embodiment, the surface 102 of the physical object 100 can be described by a parametric mesh.

Referring to FIG. 2, a flowchart of a method of generating a design of a physical object is shown in accordance with an embodiment. The embodiments described herein can be used in simulations of the physical object 100 in order to determine whether a particular design of the physical object satisfies particular design requirements, e.g., a predetermined strength, a fluid flow profile, etc. For example, there might be certain design requirements relating to a predetermined stress that the physical object 100 must withstand or a thrust that the physical object must generate, or design requirements relating to whether the surface 102 precludes cavitation in a fluid flowing over the physical object. Modeling a flow domain around the surface 102 of the physical object 100 can allow simulating such physical characteristics of the physical object. More particularly, FIG. 2 shows a method in which these design requirements can be tested relative to a particular design of the physical object 100 that is being simulated.

At operation 202 of FIG. 2, a data processing system (e.g., a computer executing simulation software to provide a simulation system) can receive data about a design for a particular physical object 100, e.g., a hydromachinery turbine. This data can be similar to the data inputted into TurboGrid from Ansys, Inc. of Canonsburg, Pennsylvania. The data can be created in computer-aided design (CAD) software on a data processing system, and the data can include a parametric mesh.

At operation 204, the data processing system can perform one or more simulations (such as simulations based on a mesh model of a flow domain around the physical object 100) to evaluate the design of the physical object by determining, for example, stress or fluid flow data (such as changes in mechanical stress over time in the physical object or pressure within fluid flowing over the physical object) during the simulated operation of the physical object 100.

The flow domain mesh can include a boundary conforming to the parametric mesh representing the physical object 100.

At operation 206, the designer can evaluate the results of the one or more simulations to determine whether the design of the physical object 100 satisfies certain desired criteria for the design. This determination is shown at operation 208. If the one or more criteria is satisfied, then the designer at operation 210 can provide data about the physical object 100 to allow the fabrication or manufacture of the physical object. For example, if the one or more criteria are satisfied, a CAD file can be produced that describes how to build the physical object 100. If the criteria are not satisfied as determined in operation 208, the designer can revise the design in operation 212 (for example, by changing a dimension or material of the physical object, etc.) and repeat the process by performing additional further simulations to evaluate the redesigned physical object 100. This can be repeated until the desired criteria are achieved for the physical object 100.

Referring to FIG. 3, a flowchart of a method of generating a mesh representing a flow domain around a surface of a physical object is shown in accordance with an embodiment. The method includes operations that are illustrated in FIGS. 4-26, and thus, FIGS. 3-26 shall be referred to and described in combination below. An input of the method can be a geometry of the physical object 100 and/or an initial mesh of a flow domain around the physical object. The output of the method can be a final mesh for use in the design method of FIG. 2. The final mesh, as described below, can be a smooth, conformal mesh that has both high quality mesh characteristics and is an excellent approximation of the flow domain.

At operation 302, a physical object geometry can be received by a memory of a system (such as any of the systems described below with respect to FIGS. 27-29). The physical object geometry can be, for example, a CAD model, such as a parametric surface, of the physical object 100. The physical object 100 can include hydromachinery, such as a turbine having a blade defined by the surface 102. The input geometry can describe a geometry of the blade, including cross-sectional profiles of the blade at various height levels.

Figure 4:
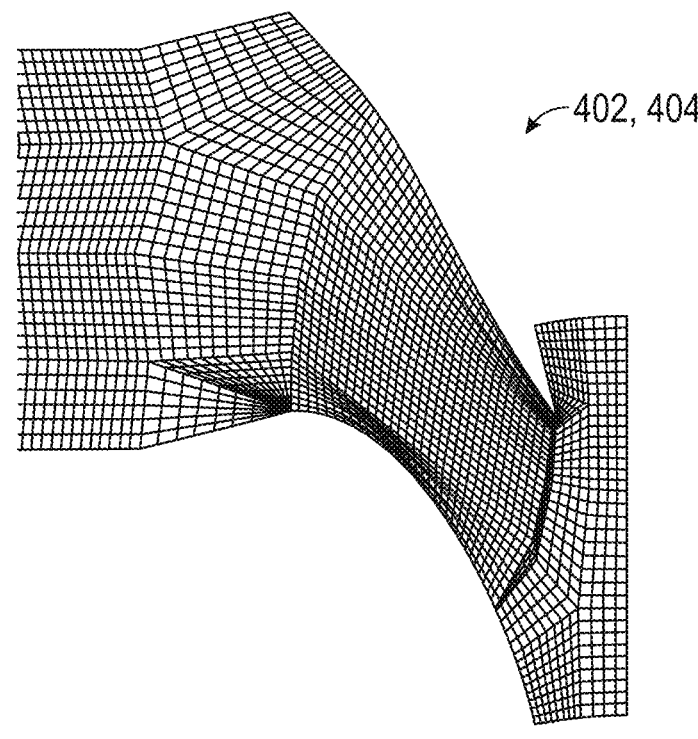
FIG. 4 is a pictorial view of a flow-centered initial mesh, in accordance with an embodiment.

Referring to FIG. 4, a pictorial view of a flow-centered initial mesh is shown in accordance with an embodiment. At operation 304, the memory of the system receives an initial mesh 402 representing a flow domain 404 around the surface 102 of the physical object 100. In an embodiment, the flow domain 404 can be determined from the physical object 100 geometry. For example, the flow domain 404 may include a volumetric space defined between the surface 102 of the physical object 100 and various boundaries. The boundaries can include, for example, a shroud of the hydromachinery around the turbine, an inlet or an outlet of the flow domain 404, e.g., upstream and downstream of the blade 101, etc. The boundaries may be determined for the flow domain 404 around the blade 101 at different height levels of the blade.

The initial mesh 402 and the other meshes described herein may be parametric meshes. A parametric mesh can be any mesh for which a parametric space exists. More particularly, the term mesh is used as a term of art distinct from the concept of a grid, which as used herein, refers to a mapping of points within a parametric space to points within a parametric mesh. Therefore, to avoid confusion, the term mesh or parametric mesh is used in relation to cartesian coordinates [X, Y, Z] of a parametric surface, and the term grid or parametric grid is used in relation to coordinates in (s, t) on the domain [0, 1] of a parametric space, which maps to the mesh.

Although the initial mesh 402 is described as being received at operation 304, it will be appreciated that the method may also include an operation to generate the parametric mesh. More particularly, the initial parametric mesh may be generated by the system or another system. The generated initial mesh 402 may then be transmitted to, and received by, the memory of the system for use in the operations described below.

The flow domain 404 can be a true flow domain that is approximated by the initial, updated, and final meshes described below. More particularly, the initial mesh 402 can include a coarse representation of the flow domain 404, and the final mesh can be a fine representation of the flow domain 404. In both cases, the meshes can be parametric surface approximations because the meshes can include mesh faces formed between mesh lines that intersect at mesh points (also known as vertices).

In an embodiment, the initial mesh 402 can be generated based on a 2D topology (not shown) of the flow domain 404 at a given height of the blade 101. More particularly, the system can receive or generate the 2D topology based on the blade profile and the curves at the inlet and outlet, for the given blade height. The 2D topology can define a minimal connected set of quadrilateral faces for the 2D flow domain that is being represented by the initial mesh 402.

The initial mesh 402 can be generated based on the 2D topology. The initial mesh 402 can be defined using refining block-structured embedded meshes within topology faces of the 2D topology. The initial mesh 402 can be a flow-centered initial mesh 402 because it is defined between opposing surfaces of rotationally adjacent blades of the turbine. The flow domain 404, however, may be rotationally symmetric about a central axis of the physical object 100 and, thus, the flow domain 404 may also be represented by a blade-centered mesh, as described below.

Figure 5:
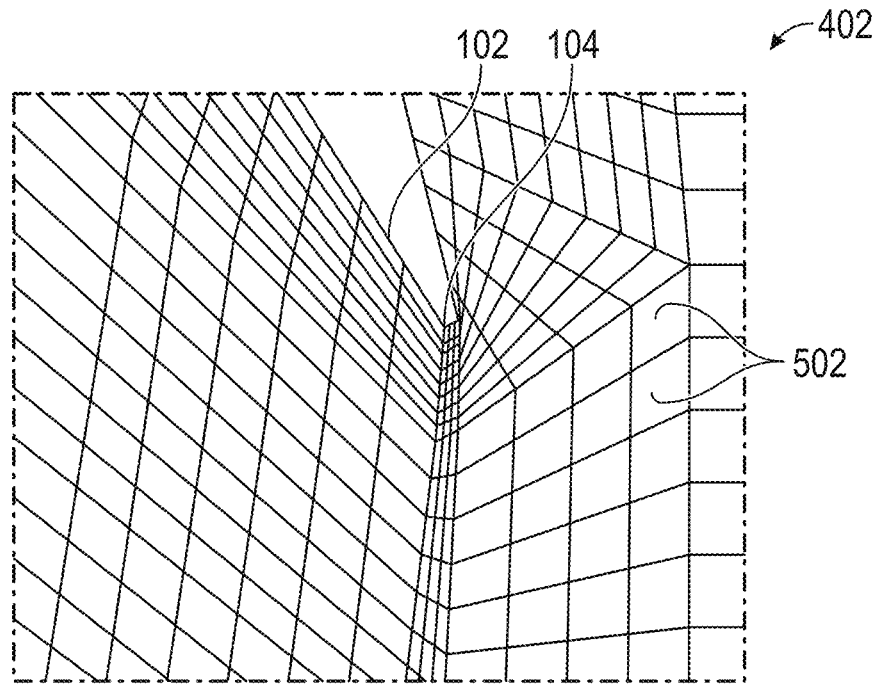
FIG. 5 is a detailed view of an initial mesh, in accordance with an embodiment.

Referring to FIG. 5, a detailed view of an initial mesh is shown in accordance with an embodiment. The initial mesh 402 can have mesh faces for a corner 104 of the surface 102. More particularly, mesh edges of several mesh faces along the surface 102 can converge at the corner 104. The corner 104 can be an angular corner, e.g., a square trailing edge. As shown, the initial mesh 402 can have poor continuity in the area around the corner 104. More particularly, the mesh lines extending or emanating from the corner 104 and along the square trailing edge can be parallel to the outlet and may inaccurately reflect a gradient of the true flow domain. Accordingly, a smoothing operation may be performed to generate valid vertex positions for the background topology, as described below.

Figure 6:
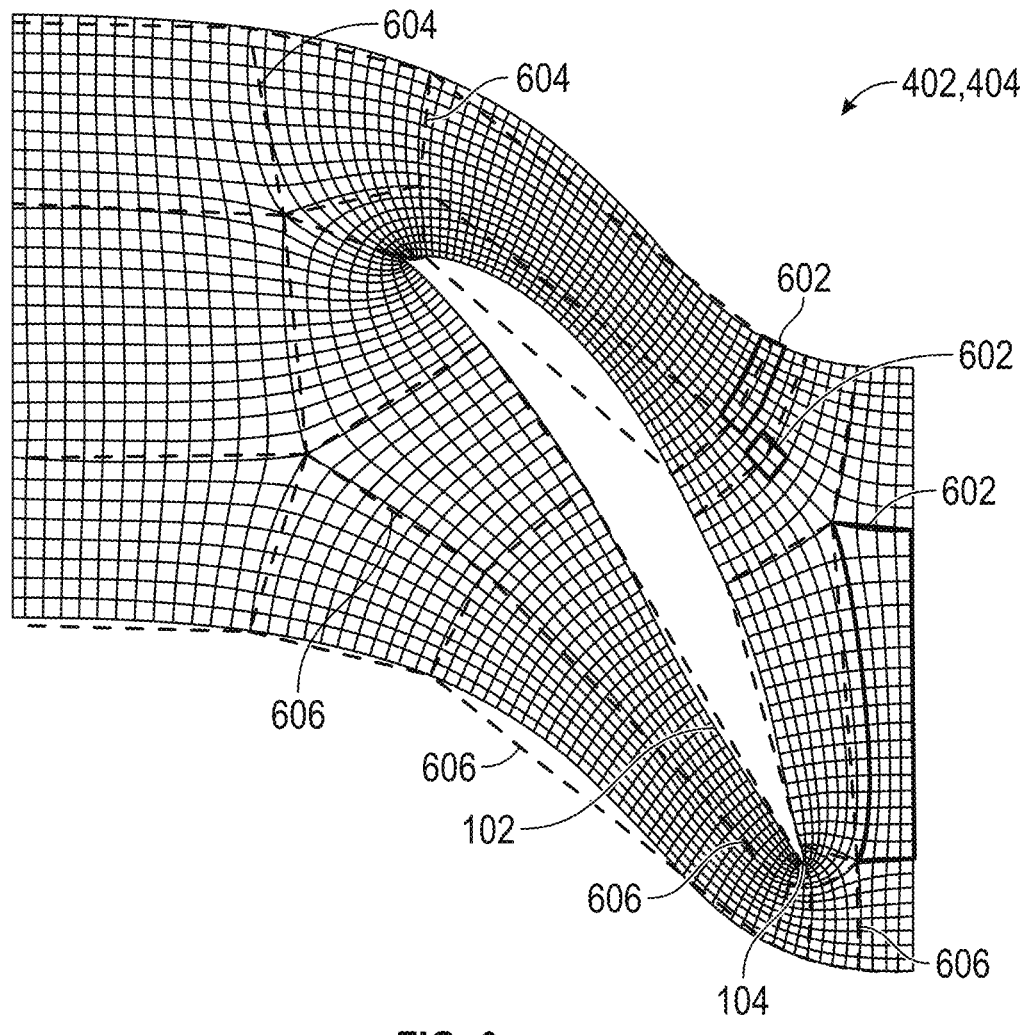
FIG. 6 is a pictorial view of an object-centered initial mesh, in accordance with an embodiment.

Referring to FIG. 6, a pictorial view of an object-centered initial mesh is shown in accordance with an embodiment. At operation 306, boundary angle-controlled elliptic smoothing along a fixed boundary may be performed. The smoothing process can be aimed at smoothing the initial mesh 402 to a get a "background mesh" that has uniform variation of mesh angles and edge lengths across the flow domain 404. More particularly, as described below, the smoothing with angle control at a fixed boundary will keep points at the boundary fixed and the mesh angles at those points controlled while improving the mesh interior continuity.

The initial mesh 402 can include one or more block-structured embedded meshes 602 within the 2D topology 604. More particularly, as described above, a topology 604 of the flow domain 404 can include one or more topology faces 606, and the topology faces 606 can contain the block-structured embedded meshes 602. The block-structured embedded meshes 602 can represent virtual faces or true faces of the topology 604. For example, a virtual face can include a group of block-structured embedded meshes 602 from two or more adjacent topology faces 606. By contrast, a true face can include a group of block-structured embedded meshes 602 from a single topology face 606. In an embodiment, two topology faces 606 meet at the corner 104 of the surface 102 and, thus, a virtual face can be defined by the mesh formed from portions of meshes from the adjoining topology faces 606 defining the corner 104.

The block-structured embedded meshes 602 provide a coarse cartesian representation of the flow domain 404. More particularly, the initial mesh 402 can be structured in that the mesh may be a structured mesh having commonly shaped faces. For example, the mesh faces can be only quadrilateral faces. As a result, the mesh can be extremely coarse and inaccurate, but may be minimally representative of a large-scale geometry of the flow domain 404. Accordingly, the structured mesh can be a starting point to represent an overall geometry of the flow domain 404.

Figure 7:
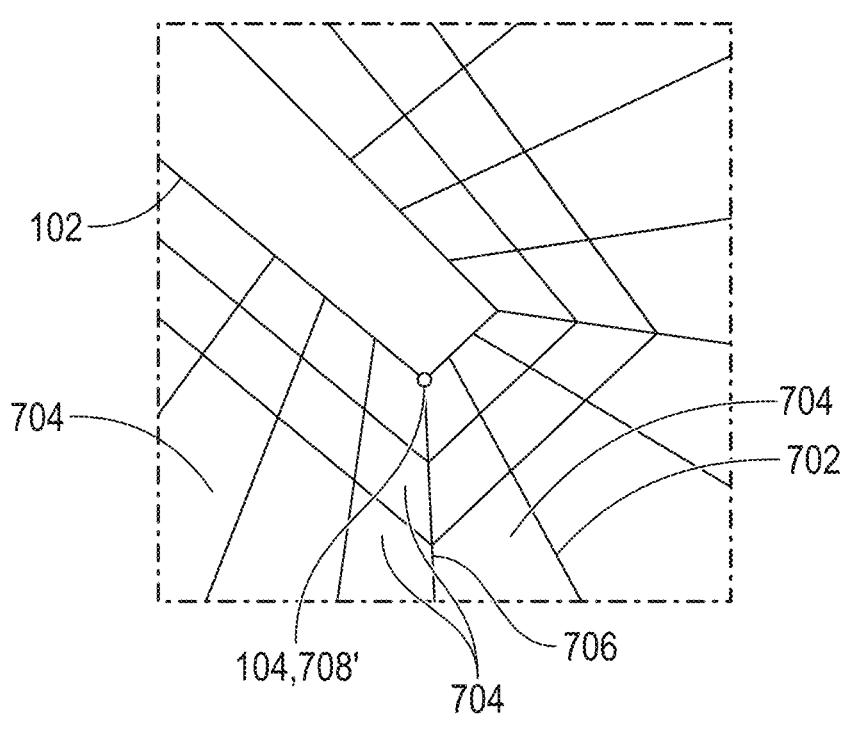
FIG. 7 is a pictorial view of an unsmoothed mesh around a corner of a physical object, in accordance with an embodiment.

Referring to FIG. 7, a pictorial view of an unsmoothed mesh around a corner of a physical object is shown in accordance with an embodiment. The depicted portion of the initial mesh 402 includes a virtual face 702 including mesh faces 704 around the corner 104 of the surface 102. For example, the virtual face 702 can include block-structured embedded meshes 602 within the topology 604 of the flow domain 404, and the several topology faces 606 of the topology 604 can meet at the corner 104 of the surface 102. The virtual face 702 can include two or more mesh faces 704 on opposite sides of a topology edge 706 extending from the a corner vertex 708 between the topology faces 606. A topology vertex of the topology edge 706, coinciding with the corner vertex 708 at the corner 104, can become a midpoint on a side of the virtual face 702.

Figure 8:
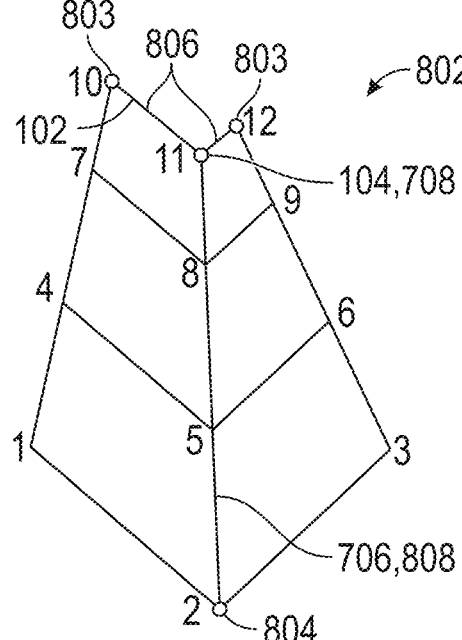
FIG. 8 is a pictorial view of a block mesh, in accordance with an embodiment.

Referring to FIG. 8, a pictorial view of a block mesh is shown in accordance with an embodiment. The virtual face 702 can include a block mesh 802 for the corner 104 of the surface 102, including the mesh edges and mesh vertices around the corner 104. The block mesh 802 can include mesh edges interconnecting mesh vertices along outer edges of the block mesh 802. For example, the mesh vertices of the initial mesh 402 can include the corner vertex 708 for the corner 104 of the surface 102, two boundary vertices 803, and a border vertex 804. Boundary edges 806 of the outer edges can connect the two boundary vertices 803 to the corner vertex 708. The boundary edges 806 can be for boundaries of the flow domain 404 around the corner 104 of the surface 102. Similarly, a border edge 808 can connect the corner vertex 708 to the border vertex 804. The border edge 808 may be collinear with the topology edge 706.

The vertices and edges of the block mesh 802 may be referred to according to the numbered vertices of FIG. 8. For example, the outer edges of the block mesh 802 can include a first boundary edge 806 along line 10-11, and a second boundary edge 806 along line 11-12. Other outer edges can include lines along 1-10, 1-2, 2-3, and 3-12. The interior edges of the block mesh 802 can include the border edge 808 along line 2-11. Other interior edges can include lines along 7-8, 8-9, 4-5, 5-6, 1-2, and 2-3. The edges can meet at vertices including the corner vertex 708 at point 11, the boundary vertices at points 10 and 12, and the border vertex 804 at point 2. The other vertices include the vertices at points 1, 3, 4, 5, 6, 7, 11, and 9.

Figures 9, 10:
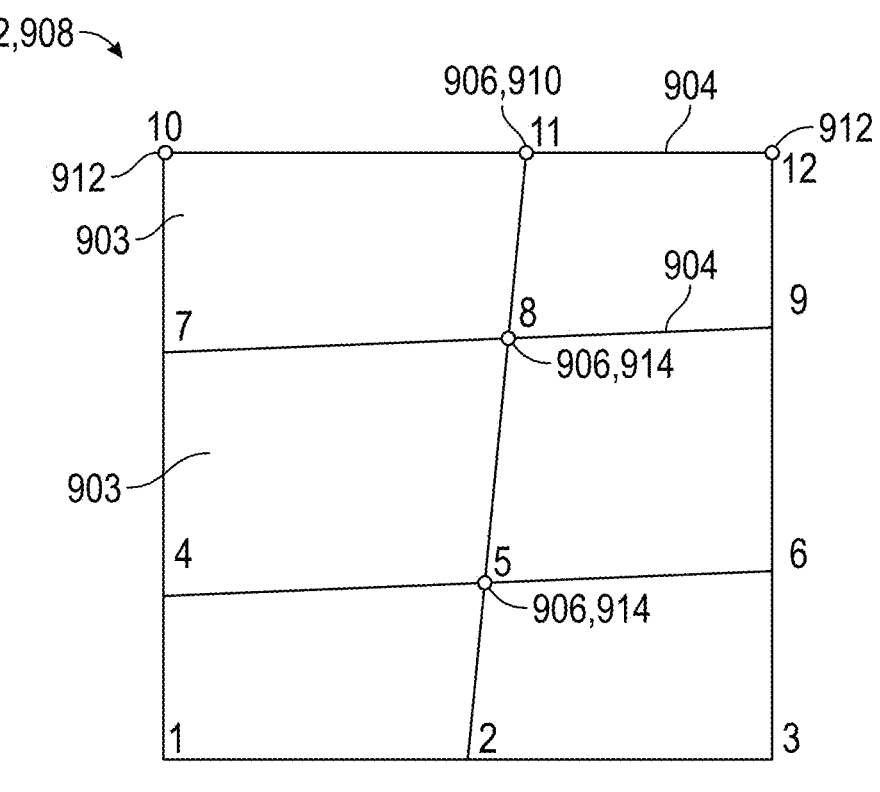
FIG. 9 is a pictorial view of a block grid, in accordance with an embodiment.
FIG. 10 is a pictorial view of an updated block mesh, in accordance with an embodiment.

Referring to FIG. 9, a pictorial view of a block grid is shown in accordance with an embodiment. The initial mesh 402 can have a corresponding parametric representation. More particularly, the initial parametric mesh can correspond to a parameterized representation of an approximation of the flow domain 404. The parameterized representation can include an initial parametric space that is represented by a grid 902. The parametric space can be a normalized [0,1] space, which maps to the initial parametric mesh 402 or the corresponding parametric flow domain 404 and, although the parametric space is not itself a grid 902, it can be represented as a grid 902 (in this case the initial parameter grid 902). Each point on the grid 902, e.g., at which grid lines 904 intersect, can have grid values corresponding to (s, t) values in the normalized space. Accordingly, the initial parametric space can be associated with the initial parametric mesh via a mapping relationship and can be represented by the initial grid. Given that the initial grid represents the initial parametric space, the initial grid 902 may also be considered to be associated with the initial mesh 402 via the mapping relationship.

As used herein, the term mapping refers to an implicit or explicit function that relates coordinates in one space to another. For example, a coordinate of a parametric mesh, such as the initial mesh 402, can be mapped to a coordinate of the parametric space, as can be represented by the initial grid 902, via an implicit or explicit function.

The grid 902 can represent the mesh as a single representative surface that is smooth and continuous everywhere. The grid 902 corresponds to the block-structured, quadrilateral mesh and, thus, can represent a corresponding quasi-uniform parametric space. The parameter grid 902 can include grid spaces 903 formed between grid lines 904 that intersect at grid points 906. The grid points 906 of the parameter grid 902 can have coordinates in (s, t) on the domain [0, 1] of a parametric space. More particularly, each grid point 906 can be an (s, t) representation of a corresponding vertex of the parametric mesh. Every grid point 906 in the parametric space can map to a vertex, e.g., a mesh point, in three-dimensional space. The mapping relationship can be through a mathematical function that transforms the grid points 906 into a smooth and continuous parametric surface representation approximating the underlying flow domain 404.

In an embodiment, the grid 902 includes a block grid 908 corresponding to the block mesh 802. More particularly, the block mesh 802 includes mesh vertices that correspond to grid points 906 of the block grid 908 according to the mapping relationship. For example, the block grid 908 can have border grid points 906, numbered 1, 2, 3, 4, 6, 7, 9, 10, 11, and 12, which correspond to the mesh vertices along the outer edges of the block mesh 802. By way of example, the block grid 908 includes a corner grid point 910 corresponding to the corner vertex 708 of the block mesh 802 according to the mapping relationship. Similarly, boundary grid points 912, numbered 10 and 12, map to the identically numbered boundary vertices 803 of the block mesh 802.

The block grid 908 can include interior grid points 906 corresponding to interior vertices of the block mesh 802. Correspondence between the interior grid points 906 and the interior vertices may, however, approximate the mapping relationship rather than be determined directly by the mapping relationship. More particularly, the interior vertices and/or edges of the block grid 908 can be initialized using arclength parameterization in which the interior grid points 914 corresponding to mesh vertices are interpolated between border grid points 906 mapped to outer edge vertices. By way of example, the interior grid points 914 can be linearly interpolated between the border grid points 906. For example, a line connecting the corner grid point 910 (one of the border grid points 906) to the border grid point 906 labeled 2 may intersect a line connecting the border grid points 906 numbered 7 and 9. An intersection of those lines can be an interior grid point 914 numbered 8. Similarly, the line connecting the corner grid point 910 to the border grid point 906 labeled 2 may intersect a line connecting the border grid points 906 numbered 4 and 6. An intersection of those lines can be an interior grid point 914 labeled 5. The interior grid points 906 labeled 5 and 8 can be determined by such interpolation and can correspond to mesh vertices numbered 5 and 8 in FIG. 8. Accordingly, the virtual face 702 on the internal topology edge 706 that is connected to the cutoff corner vertex 708 can correspond to an s-t space initialized to an interpolation from the arclength parameterization on the boundary.

Virtual faces 702 of the topology 604 that do not include mesh faces 704 along a boundary of the physical object 100 may correspond to 2D parametric space initialized to uniform. More particularly, portions of the initial mesh 402 not captured within block meshes 802 on or adjacent to a boundary of the mesh, e.g., along the surface 102, may correspond to grid points 906 according to the mapping relationship, without interpolation to determine interior grid points 914.

Referring to FIG. 10, a pictorial view of an updated block mesh is shown in accordance with an embodiment. As described above, the smoothing process seeks, in part, to improve continuity of the initial mesh 402. For example, rather than extending from the corner vertex 708 parallel to the outlet, the mesh edge along the border edge 808 of the block mesh 802 may more accurately reflect the flow domain 404 by extending at a different angle from the corner vertex 708. Accordingly, the smoothing process can include updating the block mesh 802 and/or the block grid 908 to reflect such changes in angles.

The border edge 808 may extend from the corner vertex 708 at a first angle 1002 to the boundary edge 806 along line 10-11. Similarly, the border edge 808 may extend from the corner vertex 708 at a second angle 1004 to the boundary edge 806 along line 11-12. In the initial mesh 402, the first angle 1002 may be unequal to the second angle 1004. For example, the first angle 1002 may be 120 degrees and the second angle 1004 may be 150 degrees. To update the mesh and achieve a more accurate representation of the flow domain 404, the smoothing process may reduce a difference between the angles formed by the boundary edges 806 and the border edge 808. For example, the smoothing process can adjust the border edge 808 to cause the first angle 1002 to be within a predetermined difference from the second angle 1004. In an embodiment, the smoothing process can move the border edge 808 by a difference angle 1006 until the first angle 1002 equals the second angle 1004. The process of adjustment may involve iterative changes of the block grid 908 and the block mesh 802, as described below.

Adjustment of the block mesh 802 and the block grid 908 may be to interior vertices and grid points, while maintaining vertices and grid points along the mesh and grid borders fixed. Still referring to FIG. 10, adjustment of the border line from the initial, solid line location to the updated, dotted line location may occur in the block mesh 802 by moving the vertex numbered 8 toward the right. The border edge 808 can therefore swing to the right by the corresponding difference angle 1006 to reduce the difference in angles

1002, 1004. Notably, the corner vertex 708 can remain fixed at the corner 104 while the interior mesh vertices shift.

Figure 11:
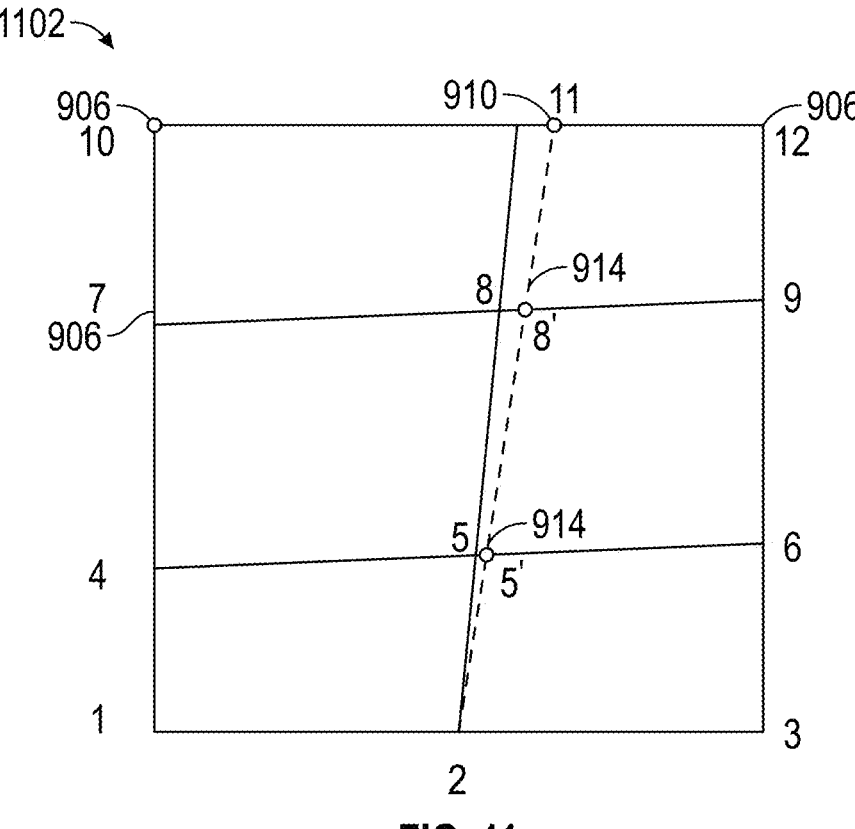
FIG. 11 is a pictorial view of an updated block grid, in accordance with an embodiment.

Referring to FIG. 11, a pictorial view of an updated block grid is shown in accordance with an embodiment. In contrast to the block mesh 802, the smoothing process can update the block grid 908 to create an updated grid 1102. In the updated grid 1102, the corner grid point 910 corresponding to the fixed corner vertex 708 can shift. More particularly, the one or more processors of the system can update the corner grid point 910 to obtain the updated grid 1102 in the parameterized space according to angles formed by the boundary edges 806 and the border edge 808. The updated parametric space can use an angle based correction factor for controlling the mesh angle at the fixed boundary point. For example, the smoothing process can drive toward a goal of making the first angle 1002 equal to the second angle 1004, or some other predetermined angular relationship.

The angular relationship goal may be driven by updating the block grid 908 according to a correction factor, $f_c$. The correction factor can be determined, for example, as: $f_c = \theta_D / (\theta_W + \theta_E)$. A value of $f_c$ can be positive or negative depending on Op being positive or negative. Thus, the values of $f_c$ can increase or decrease the mesh angle at the fixed boundary mesh point.

The corner grid point 910 can be changed from an initial (s,t) value (FIG. 9) to an updated (s,t) value as shown in FIG. 11 by changing the s-value from the initial s-value, $s_{initial}$, to a new s-value, $s_{new}$. The new s-value may be determined, for example, as: $s_{new} = s_{initial} - f_c \times f_{ur} \times s_{initial}$. In this equation, $f_{ur}$ can be an under relaxation factor for control on convergence speed and, thus, stability. For example, the under relaxation factor can be in a range of 0.5 to 0.8, e.g., 0.7. Stability may also be controlled by clipping, if needed, $s_{new}$ to be within an acceptable range of (0, 1). Accordingly, the (s,t) value of the corner grid point 910 can be updated and moved within parametric space.

As the corner grid point 910 moves, so may the interior grid points 914 move. Adjustment of the (s,t) values of the corner grid point 910 can result in modifications to the interpolated (s,t) values of the interior grid points 914 numbered 5 and 8. More particularly, the interior grid points 914 can shift in a same direction as the corner grid point 910 to new locations at the points numbered 5' and 8'.

Notably, the border grid points 906, other than the corner grid point 910, can be kept fixed during the grid update. More particularly, the corner grid point 910 can be updated to obtain the updated grid 1102 by maintaining fixed in the parameterized space other grid points 906 corresponding to vertices along the outer edges of the block mesh 802. Accordingly, the (s,t) values of the grid points 906 in the updated grid 1102 numbered 1, 2, 3, 4, 6, 7, 9, 10, and 12 can remain the same as the initial grid 902, even though the (s,t) values of the corner grid point 910 and the interior grid points 906 change.

Figure 12:
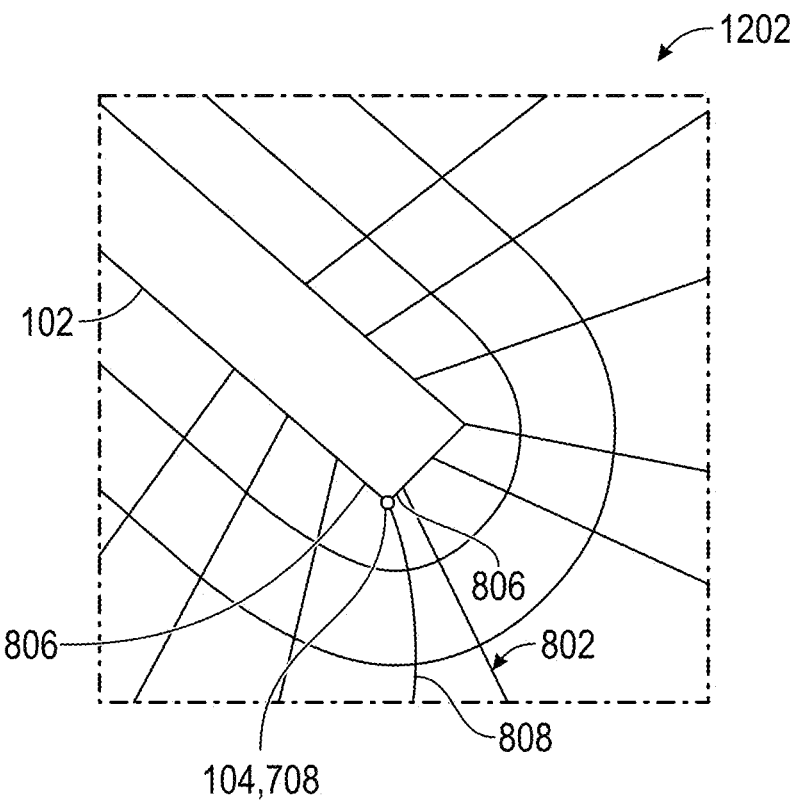
FIG. 12 is a pictorial view of a smoothed mesh around a corner of a physical object, in accordance with an embodiment.

Referring to FIG. 12, a pictorial view of a smoothed mesh around a corner of a physical object is shown in accordance with an embodiment. The one or more processors of the system can determine an updated mesh 1202 from the initial mesh 402 according to the updated grid 1102 and the mapping relationship. During elliptic smoothing to create the updated mesh 1202, the mesh vertices on the outer edges of the block mesh 802 remain fixed. Similarly, the corner vertex 708 at the corner 104 of the surface 102 may also remain fixed. Thus, although the corner grid point 910 moves in the parameterized space, the location of the corner vertex 708 in the cartesian space remains fixed at the corner 104. Accordingly, updating the corner grid point 910 includes moving the corner grid point 910 in the grid 902 without moving the corner vertex 708 in the updated mesh 1202. The fixed boundary of the surface 102 is therefore enforced to remain fixed in the block structured mesh so that even though a parametric grid point 906 corresponding to the corner 104 shifts, the effect in the cartesian mesh is only to cause the border edge 808 to change angles, e.g., bend, rather than to move the corner vertex 708. Such bending is exaggerated in FIG. 12, as compared to other edges running outward from the boundary 102 for the purpose of illustration, however, it will be understood that the comparatively excessive bend is a temporary state and that smoothing operations applied to other block meshes will cause the entire mesh for the flow domain to become synchronized and have harmonious bending.

The movement of the border edge 808 in the cartesian space can equalize the angles formed by the boundary edges 806 and the border edge 808. More particularly, determining the updated mesh 1202 can equalize the angles. The angle equalization can be achieved iteratively. More particularly, the elliptic smoothing can repeatedly update the grid 902 based on the difference in angles 1002, 1004, shift the block mesh 802 corresponding to the updated grid 1102, determine the difference angle 1006, and repeat the process until the difference in angle 1006 is driven to a predetermined value, e.g., zero. The boundary angle controlled smoothing can therefore iteratively adjust the border edge 808 to maintain a prescribed angle at the fixed corner 104. Providing a mechanism for angle control at fixed corners 104 during multi-block elliptic smoothing, as described above, may be only one of several operations in the smoothing process, however. Additional operations are described below.

Figure 13:
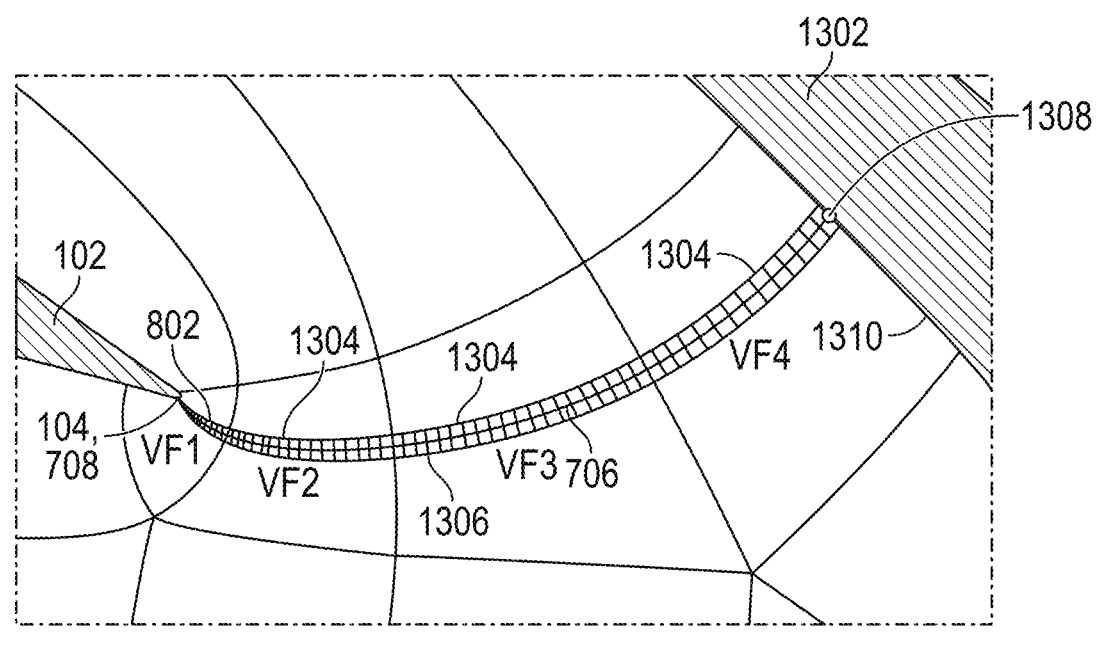
FIG. 13 is a pictorial view of a chain of block meshes between surfaces of a physical object, in accordance with an embodiment.

Referring to FIG. 13, a pictorial view of a chain of block meshes between surfaces of a physical object is shown in accordance with an embodiment. Modifying the angle of the border edge 808 extending from the corner 104 of the surface 102 can more accurately reflect the flow domain 404 around the corner 104. However, without modifying adjacent mesh blocks, the mesh portions between the surface 102 and a second surface, e.g., of a second blade, may have abrupt jumps or bends in their mesh edges. More particularly, the mesh can include several secondary block meshes 1304 connected with the block mesh 802 in a chain 1306 between the corner vertex 708 for the corner 104 of the surface 102 and a boundary vertex 1308 for a boundary 1310 of the second surface 1302 of the physical object 100. The chain 1306 can be a linear chain of virtual faces 702 on the topology edge 706 between the physical object features. The full connected chain of block meshes between the corner vertex 708 and the boundary vertex 1308 can be updated to smooth the mesh edges over the flow domain 404 between the physical object features.

Figure 14:
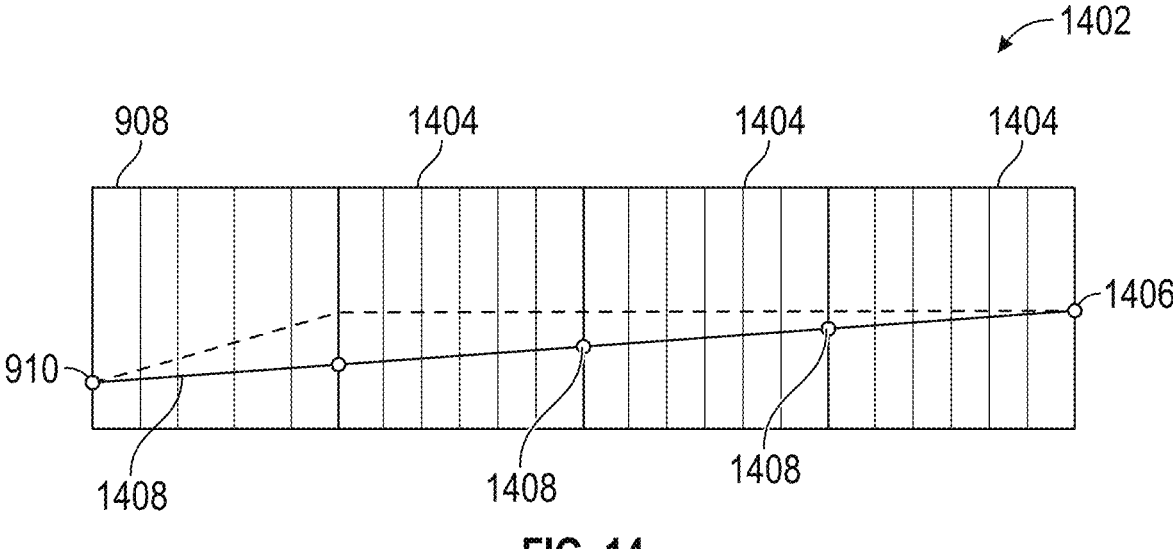
FIG. 14 is a pictorial view of a chain grid, in accordance with an embodiment.

Referring to FIG. 14, a pictorial view of a chain grid is shown in accordance with an embodiment. Smoothing the full connected chain 1306 can include combining and updating s-t spaces of the linear chain of virtual faces. The grid 902 includes a chain grid 1402, which can include the block grid 908, and one or more secondary chain grids 1404 in the parameterized space. The chain 1306 corresponds to the chain grid 1402 of the grid 902. The chain grid 1402 represents the parameterization of the cartesian space between the blade 101 having the corner 104 and the second surface 1302, e.g., of an adjacent blade. Accordingly, the chain grid 1402 includes the corner grid point 910 and an end grid point 1406 corresponding to the boundary vertex 1308 at the end of the chain 1306.

The depicted parameterization includes lines along the chain 1306 and, in particular, a dark line representing parameterization of the topology edge 706 in the updated mesh 1202, and a light line representing a smoothed topology edge 706 along the virtual faces 702 of the full chain 1306. It will be appreciated that the dark line experiences a kink or knee between a first virtual face (the block mesh 802) and an adjacent virtual face. Such kink results from the first virtual face being smoothed with angle control and the adjacent virtual face being smoothed with traditional smoothing techniques.

The kink in the parameterized space, and the corresponding reduced continuity in the cartesian space, can be corrected by interpolating one or more chain grid points 906 along the light line. More particularly, the chain grid 1402 includes the corner grid point 910, the end grid point 1406, and several chain grid points 1408 linearly interpolated between the corner grid point 910 and the end grid point 1406. The linearly interpolated (s,t) values of the chain grid points 1408 can create a smooth, curved topology edge 706 between the corner 104 and the second surface 1302. Accordingly, the connected chains 1306 for combined s-t spaces can reduce local influence of angle control on the mesh across the flow domain 404.

Figure 15:
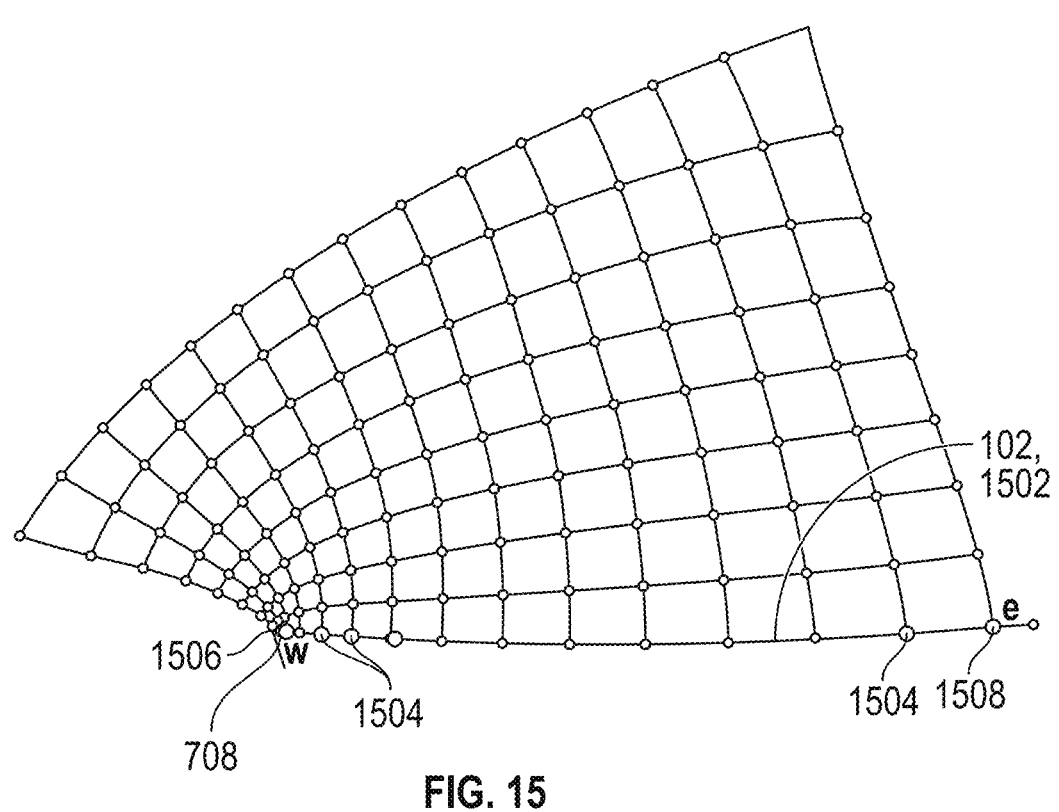
FIG. 15 is a pictorial view of a face mesh, in accordance with an embodiment.

Referring to FIG. 15, a pictorial view of a face mesh is shown in accordance with an embodiment. Smoothing at face boundary edges can be performed to improve transitions for mesh angles from the boundary angle-controlled corners. In an embodiment, a face boundary 1502 of the surface 102 extends from the corner vertex 708 along a blade face. More particularly, the initial mesh 402 can have several face vertices 1504 along the face boundary 1502 between a first surface location 1506, e.g., at a location adjacent to the corner 104 of the surface 102, and a second surface location 1508, e.g., at a location farther from the square trailing edge along the blade surface 102. The face vertices 1504 can be fixed points according to the smoothing process. Basic elliptic smoothing with fixed points at a face mesh boundary can lead to the mesh moving in a wrong direction, which does not accurately reflect the flow domain 404. Accordingly, face mesh elliptic smoothing with angle control can be used to help move the mesh in a correct direction for better angles at fixed boundary points (at the fixed face vertices 1504).

Figure 16:
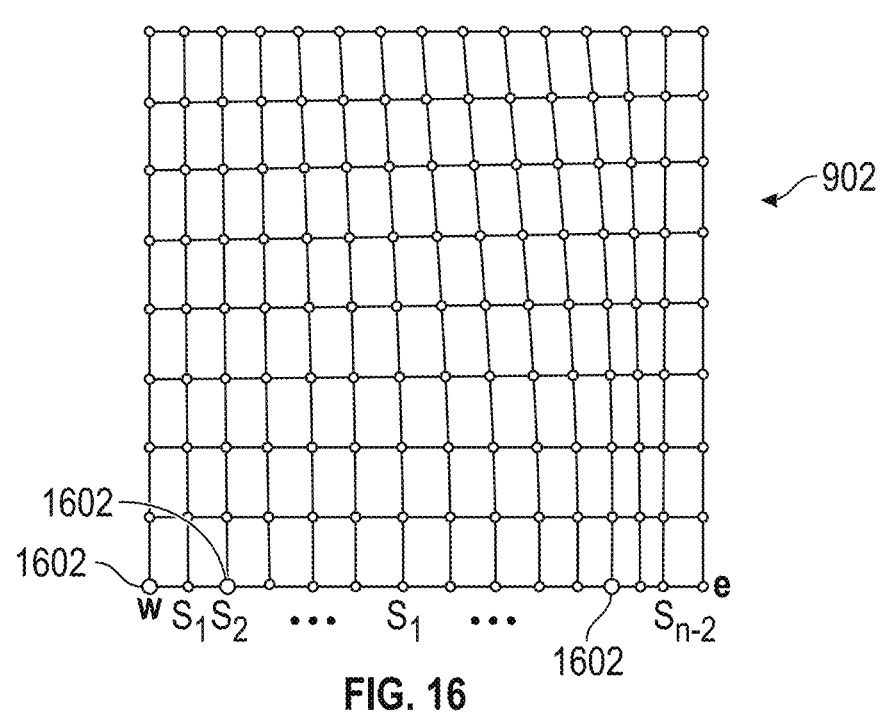
FIG. 16 is a pictorial view of a face grid, in accordance with an embodiment.

Referring to FIG. 16, a pictorial view of a face grid is shown in accordance with an embodiment. The mesh around the face boundary 1502 can have a corresponding parameterization. More particularly, each of the face vertices 1504 can have corresponding (s,t) values in the grid 902. For example, each face vertex 1504 can correspond to a face grid point 1602 according to the mapping relationship. The grid 902 can be a dynamically updated parameterization space used for smoothing the face mesh with fixed points on the face boundary 1502.

Figure 17:
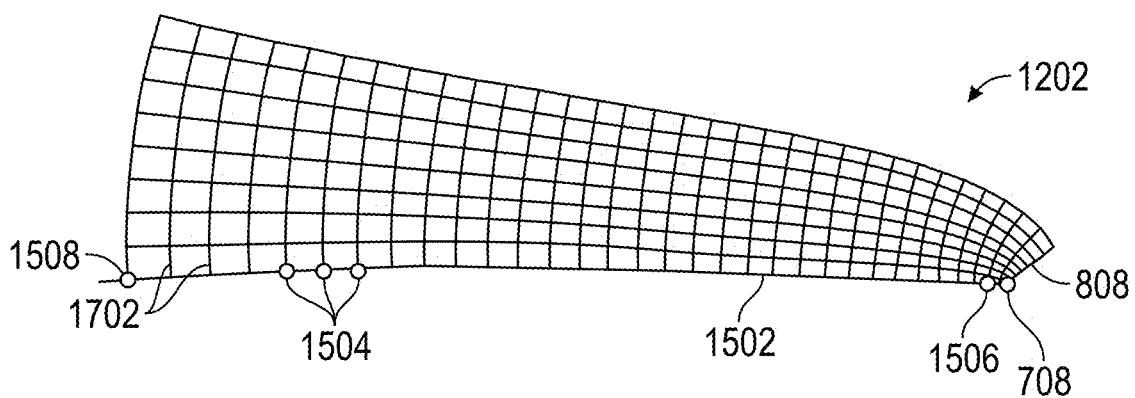
FIG. 17 is a pictorial view of a face mesh, in accordance with an embodiment.

Referring to FIG. 17, a pictorial view of a face mesh is shown in accordance with an embodiment. Face edges 1702 can extend or emanate outward from the face vertices. For example, without angle control, the face edges 1702 may typically extend orthogonal to the face boundary 1502. A desired mesh angle at the face vertices may, however, not be an orthogonal (90 degrees) angle. For example, when the face vertex 1504 is near a corner location, the border edge 808 emanating from the face vertex 1504 may be adjusted to a steeper angle aligned with the outlet. The face edges 1702 near the corner vertex 708 may be similarly adjusted to bend in the direction of the border edge 808 emanating from the corner vertex 708.

The process of prescribing angles for the face edges 1702 can be driven by a goal of providing good variation of angles along the face boundary 1502 between, e.g., the first surface location 1506 and the second surface location 1508. For example, the updated mesh 1202 can include face edges 1702 extending from respective face vertices 1504, and angles of the face edges 1702 may be adjusted based on their proximity to the border edge 808. The angles of the face edges 1702 relative to the face boundary 1502 can be based on a proximity of the respective face vertices 1504 to the first surface location 1506 or the second surface location 1508. More particularly, as described below, the angles of the face edges 1702 can be based on an aspect ratio causing the angles to be influenced by the angle of the edge emanating from the surface location that the face vertex 1504 is nearest to.

Figure 18:
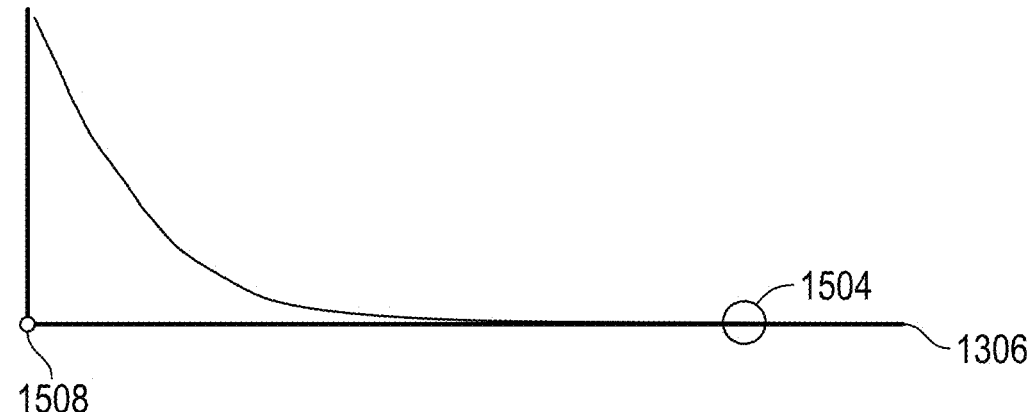
FIG. 18 is a pictorial view of a mesh angle influence curve, in accordance with an embodiment.

Referring to FIG. 18, a pictorial view of a mesh angle influence curve is shown in accordance with an embodiment. A mesh angle influence curve represents an influence of a border edge angle on a face vertex 1504. For example, the face vertex 1504 being influenced may be highlighted with a circle, and can be nearer to the first surface location 1506 than the second surface location 1508. The mesh angle influence curve may more specifically represent an influence on a prescribed angle based on the proximity to the first surface location 1506. In an embodiment, the mesh angle influence curve is a Hermite shape function curve defining a prescribed angle of the face edge 1702 emanating from the highlighted face vertex 1504. It will be appreciated that the nearer to the first location the face vertex 1504 is located, the less difference there will be between the angle of the border edge 808 at the first location and the angle of the face edge 1702 at the face vertex 1504.

Figure 19:
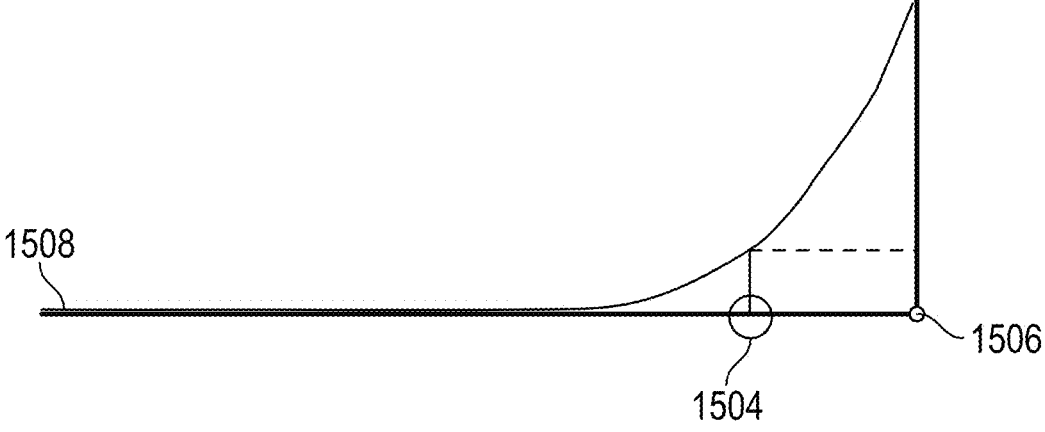
FIG. 19 is a pictorial view of a mesh angle influence curve, in accordance with an embodiment.

Referring to FIG. 19, a pictorial view of a mesh angle influence curve is shown in accordance with an embodiment. A mesh angle influence curve represents an influence of a border edge 808 angle on a face vertex 1504. For example, the face vertex 1504 being influenced may be highlighted with a circle, and can be nearer to the second surface location 1508 than the first surface location 1506. The mesh angle influence curve may more specifically represent an influence on a prescribed angle based on the proximity to the second surface location 1508. In an embodiment, the mesh angle influence curve is a Hermite shape function curve defining a prescribed angle of the face edge 1702 emanating from the highlighted face vertex 1504. It will be appreciated that the nearer to the second location the face vertex 1504 is located, the less difference 1006 there will be between the angle of the border edge 808 at the second location and the angle of the face edge 1702 at the face vertex 1504.

Figure 20:
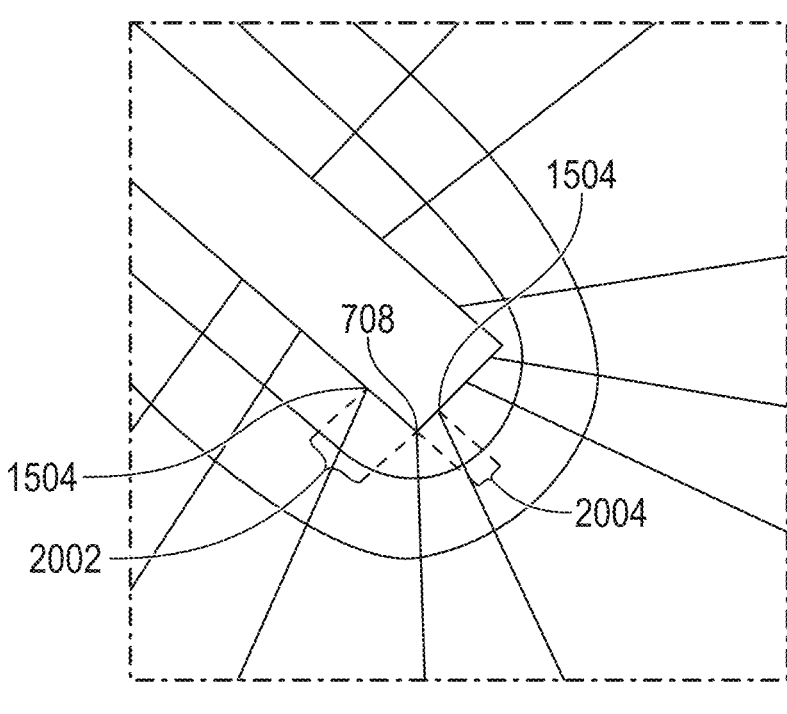
FIG. 20 is a pictorial view of a smoothed mesh around a corner of a physical object, in accordance with an embodiment.

Referring to FIG. 20, a pictorial view of a smoothed mesh around a corner of a physical object is shown in accordance with an embodiment. The mesh edge lengths may, even after initial smoothing, be inconsistent at fixed corners and around topology vertices. For example, a first edge arclength 2002 between the corner vertex 708 and an adjacent face vertex 1504 on the blade surface may be longer than a second edge arclength 2004 between the corner vertex 708 and an adjacent face vertex 1504 on the square trailing edge. Similar arclength variations may exist throughout the mesh, both along the face boundary 1502 and within the interior of the flow domain 404.

Figure 21:
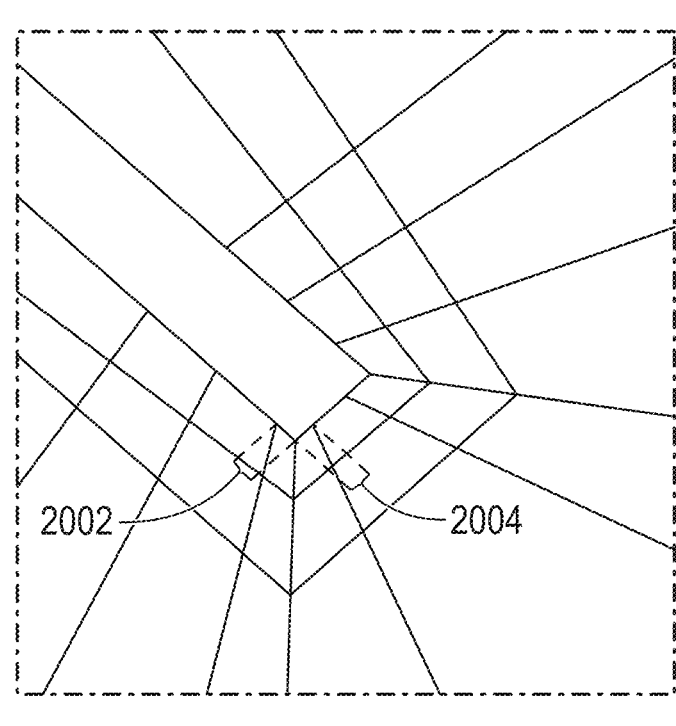
FIG. 21 is a pictorial view of a remeshed mesh around a corner of a physical object, in accordance with an embodiment.

Referring to FIG. 21, a pictorial view of a remeshed mesh around a corner of a physical object is shown in accordance with an embodiment. To improve the mesh size distribution, remeshing by arclength equalization around topology vertices may be performed. For example, the updated mesh can include mesh vertices connecting mesh edges having edge arclengths that are based on a number and a type of the mesh edges. The arclengths can be modified by moving the mesh vertices and edges to cause the first edge arclength 2002 to relate to the second edge arclength 2004 in a predetermined manner, e.g., to cause the arclengths to become equal. The arclength equalization process is described further below.

Referring to FIG. 22, a pictorial view of an arclength equalization stencil is shown in accordance with an embodiment. At operation 308, remeshing is performed with arclength equalization. Arclength equalization proceeds based on predetermined rules for modifying mesh vertices and edges based on a number and a type of mesh edges 2202 meeting at a mesh vertex 2204.

The number of mesh edges 2202 meeting at the vertex may depend on a location of the mesh vertex 2204. For example, mesh vertices in an interior of the mesh representing the flow domain 404 may join more than three, e.g., four or five, mesh edges 2202. Mesh vertices along a boundary of the mesh, e.g., at the face boundary 1502, the corner 104, the inlet, the outlet, etc., may join three mesh edges 2202. Any mesh vertex 2204 can join different numbers of mesh edges 2202 regardless of the location, however.

Mesh edge type may refer in part to the location of the mesh edge 2202. For example, the mesh edge type may refer to whether the mesh edge 2202 is an interior mesh edge, a boundary mesh edge, or otherwise located. In an embodiment, an interior mesh edge extends through the flow domain 404, and a boundary mesh edge extends along a boundary of the flow domain 404. The border edge 808 is an example of an interior mesh edge, which emanates from the corner vertex 708 across the flow domain 404. By contrast, the boundary edge 806 is an example of a boundary mesh edge, which extends along the face boundary 1502 of the physical object 100.

Still referring to FIG. 22, the mesh vertex can join four interior mesh edges. Accordingly, the connectedness is characterized by the number of mesh edges 2202 being four and the type of mesh edges 2202 being all interior mesh edges. As indicated by the dashes, arclengths of the mesh lines are adjusted to form groups of mesh lines having equal lengths. More particularly, first mesh lines entering the mesh vertex 2204 at similar angles are marked with a single dash to indicate equal arclengths, and second mesh lines entering the mesh vertex 2204 at similar angles and separated from each other by the first mesh lines are marked with double dashes to indicate equal arclengths. The first mesh lines form a first group of equal arclengths and the second mesh lines form a second group of equal arclengths.

Referring to FIG. 23, a pictorial view of an arclength equalization stencil is shown in accordance with an embodiment. The mesh vertex 2204 can join five interior mesh edges. Accordingly, the connectedness is characterized by the number of mesh edges 2202 being five and the type of mesh edges 2202 being all interior mesh edges. As indicated by the dashes, arclengths of the mesh lines are adjusted to have equal lengths. More particularly, all five mesh lines entering the mesh vertex 2204 are marked with a single dash to indicate equal arclengths. The mesh lines form a group of equal arclengths.

Referring to FIG. 24, a pictorial view of an arclength equalization stencil is shown in accordance with an embodiment. The mesh vertex 2204 can join one or more interior mesh edges with one or more boundary edges. For example, one interior mesh edge can join two boundary edges at the mesh vertex 2204. Accordingly, the connectedness is characterized by the number of mesh edges 2202 being three and the type of mesh edges 2202 including both interior mesh edges and boundary edges. As indicated by the dashes, arclengths of the mesh lines are adjusted to form groups of mesh lines having equal lengths. More particularly, the interior mesh line(s) are marked with a single dash to indicate equal arclengths, and the boundary mesh line(s) are marked with double dashes to indicate equal arclengths. The interior mesh line forms a first group of equal arclengths and the boundary mesh lines form a second group of equal arclengths.

At operation 310, after remeshing with arclength equalization, boundary angle-controlled elliptic smoothing along the fixed boundary is performed. Remeshing can disrupt interior continuity because the arclength equalization process can shift mesh vertices and mesh edges from the previously smoothed position when the mesh arclengths are modified. Accordingly, the smoothing at operation 310 is a follow-up smoothing to regain the mesh interior continuity.

The boundary angle-controlled elliptic smoothing along the fixed boundary can proceed according to the process described above with respect to operation 306. Accordingly, mesh vertices may be maintained at a fixed position around the blade profile while applying multi-block smoothing to achieve good mesh angle for the interior (as well as at the fixed mesh points).

Figure 25:
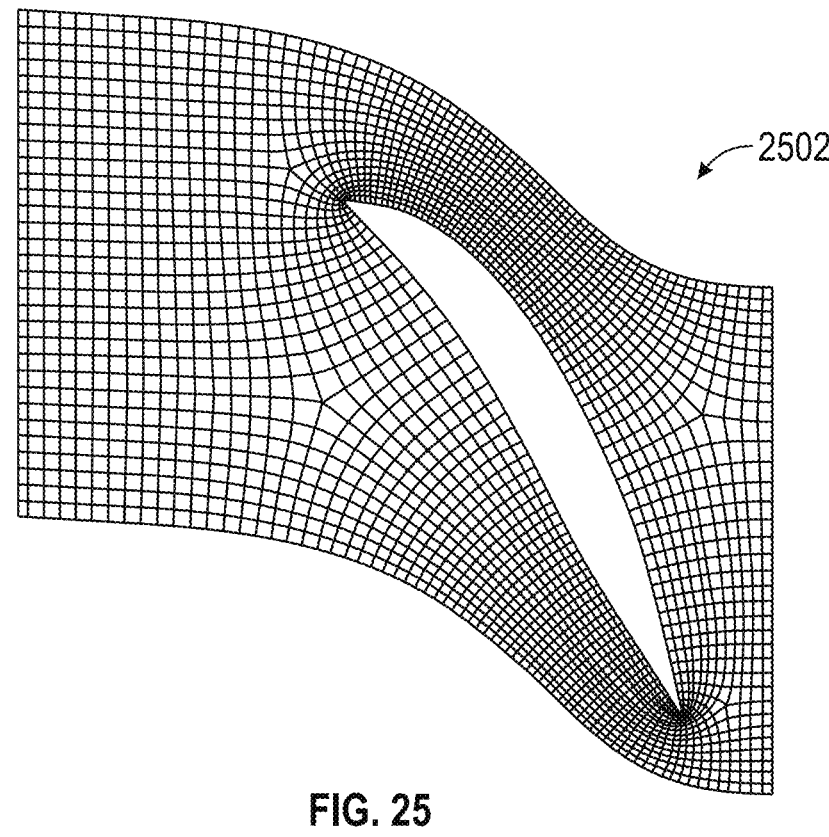
FIG. 25 is a pictorial view of an object-centered final mesh, in accordance with an embodiment.

Referring to FIG. 25, a pictorial view of an object-centered final mesh is shown in accordance with an embodiment. At operation 310, the one or more processors of the system generate a final mesh 2502. The final mesh 2502 represents the flow domain 404 with high continuity.

Figure 26:
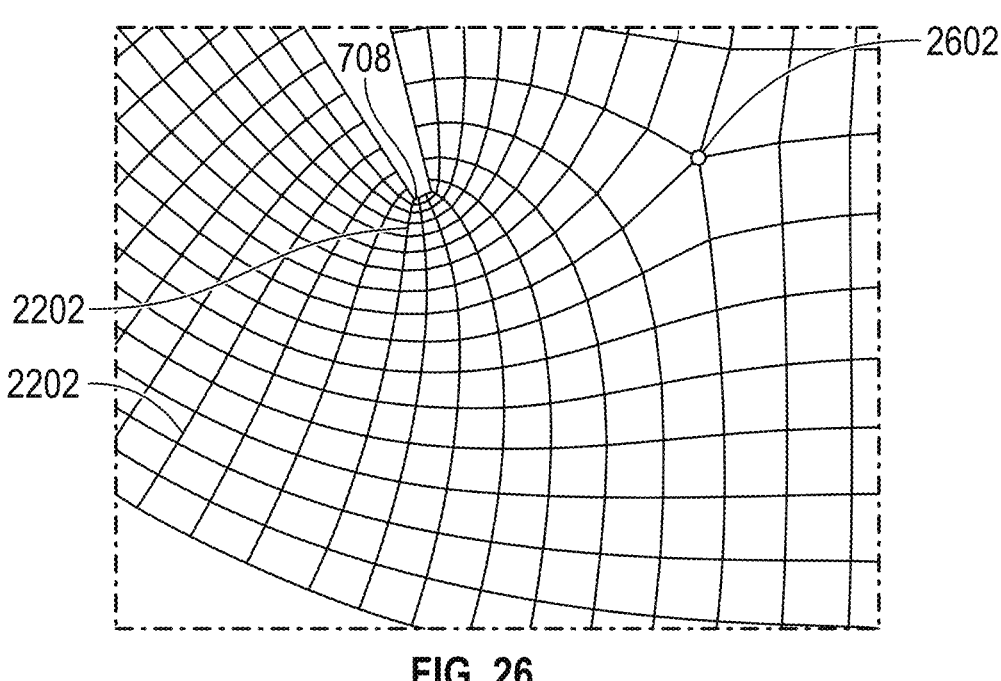
FIG. 26 is a detailed view of a final mesh, in accordance with an embodiment.

Referring to FIG. 26, a detailed view of a final mesh is shown in accordance with an embodiment. Mesh edges 2202 emanate from the blade profile at appropriate angles and mesh edges 2202 are equally sized around topology vertices. The final mesh 2502 therefore represents the flow domain 404 and allows for effective simulation of a physical characteristic of the physical object 100.

The methods and systems described herein may be implemented using any suitable processing system with any suitable combination of hardware, software and/or firmware, such as described below with reference to the non-limiting examples of FIGS. 27-29. The suitable system can include a memory and one or more processors. For example, the memory can include a non-transitory computer-readable medium storing instructions executable by the one or more processors of the system to cause the system to perform any of the operations of the method described above. Accordingly, the suitable system can perform a computer-implemented method.

Figure 27:
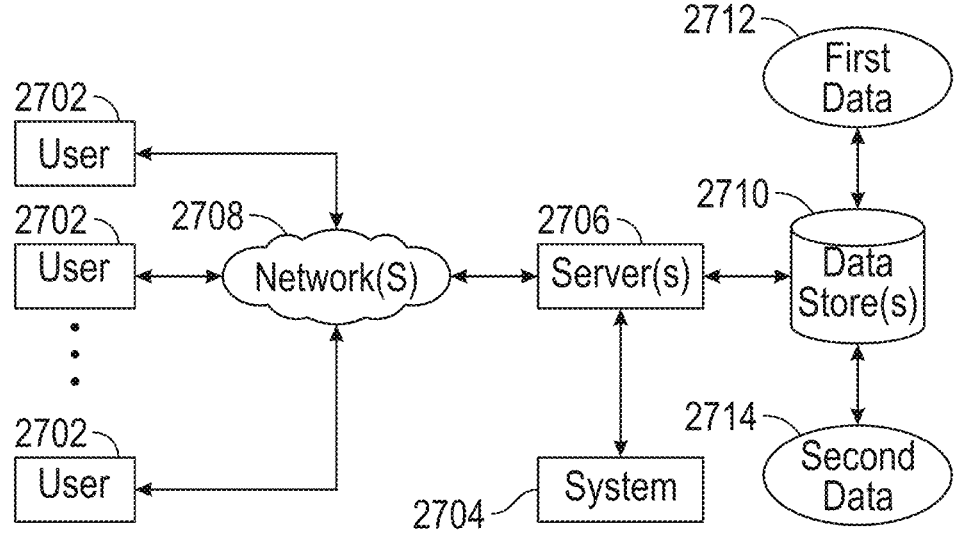
FIGS. 27-29 depicts systems that may be used in conjunction with the embodiments described herein.

Referring to FIG. 27, a system that may be used in conjunction with the embodiments described herein is shown. FIG. 27 depicts at 2700 a computer-implemented environment wherein users 2702 can interact with a system 2704 hosted on one or more servers 2706 through a network 2708. The system 2704 contains software operations or routines. The users 2702 can interact with the system 2704 through a number of ways, such as over one or more networks 2708. One or more servers 2706 accessible through the network(s) 2708 can host system 2704. The servers 2706 can have access to data stores 2710. The one or more data stores 2710 may contain first data 2712 as well as second data 2714. It should be understood that the system 2704 could also be provided on a stand-alone computer for access by a user.

Figure 28:
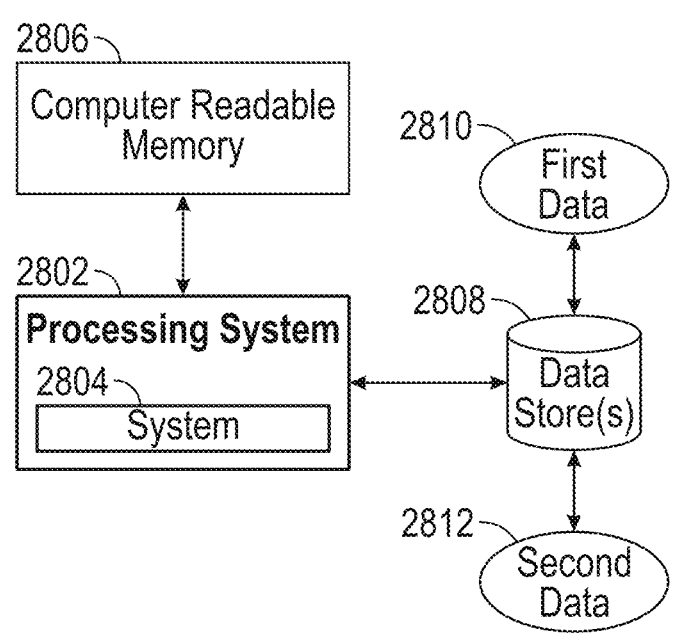

Referring to FIG. 28, a system that may be used in conjunction with the embodiments described herein is shown. FIG. 28 depicts an exemplary system 2800 that includes a standalone computer architecture where a processing system 2802 (e.g., one or more computer processors) includes a system 2804 being executed on it. The processing system 2802 has access to a non-transitory computer-readable memory 2806 in addition to one or more data stores 2808. The one or more data stores 2808 may contain first data 2810 as well as second data 2812.

Figure 29:
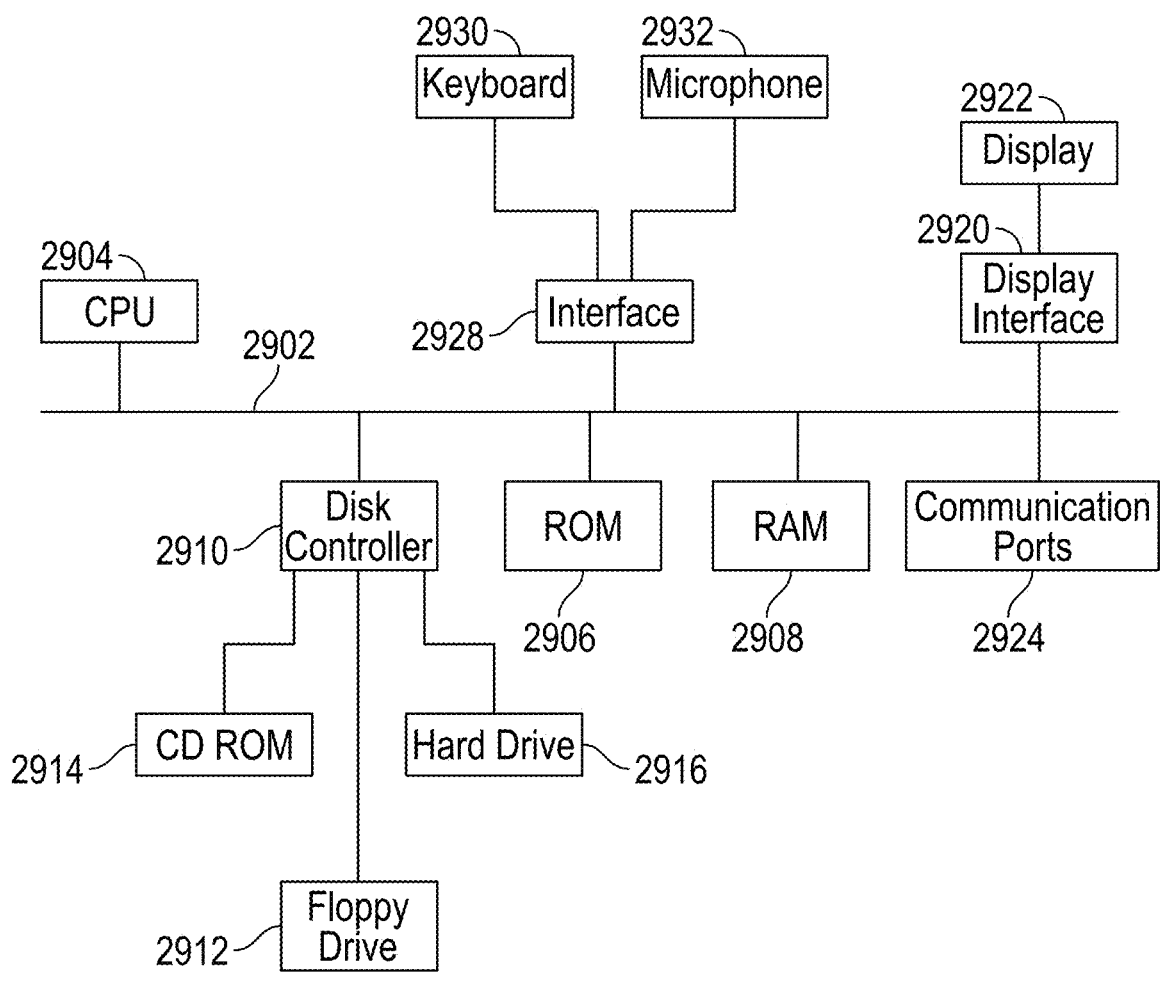

Referring to FIG. 29, a system that may be used in conjunction with the embodiments described herein is shown. FIG. 29 shows a block diagram of exemplary hardware for a standalone computer architecture 2900, such as the architecture depicted in FIG. 28, that may be used to contain and/or implement the program instructions of system embodiments of the present invention. A bus 2902 may serve as the information highway interconnecting the other illustrated components of the hardware. A processing system 2904 labeled CPU (central processing unit) (e.g., one or more computer processors), may perform calculations and logic operations required to execute a program. A non-transitory computer-readable storage medium, such as read only memory (ROM) 2906 and random access memory (RAM) 2908, may be in communication with the processing system 2904 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium.

A disk controller 2910 interfaces one or more optional disk drives to the system bus 2902. These disk drives may be external or internal floppy disk drives such as 2912, external or internal CD-ROM, CD-R, CD-RW, or DVD drives such as 2914, or external or internal hard drives 2916. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 2910, the ROM 2914 and/or the RAM 2916. Preferably, the processor 2904 may access each component as required.

A display interface 2920 may permit information from the bus 2902 to be displayed on a display 2922 in audio, graphic, or alphanumeric format. Communication with external devices may optionally occur using various communication ports 2924.

In addition to the standard computer-type components, the hardware may also include data input devices. The data input devices can transfer information to the bus 2902 through an interface 2928. The data input device can include a keyboard 2930, or other input device, such as a microphone 2932, remote control, pointer, mouse, touchscreen and/or joystick.

This written description describes exemplary embodiments of the invention, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within registers and memories of the device into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:

receiving, by a memory of a system, an initial mesh representing a flow domain around a surface of a physical object, wherein the initial mesh has a block mesh for a corner of the surface, wherein the block mesh includes a corner vertex, two boundary vertices, and a border vertex along outer edges of the block mesh, wherein boundary edges of the outer edges connect the two boundary vertices to the corner vertex for boundaries of the flow domain around the corner of the surface, wherein a border edge connects the corner vertex to the border vertex, wherein the initial mesh corresponds to a grid in a parameterized space according to a mapping relationship, and wherein the corner vertex of the initial mesh corresponds to a corner grid point of the grid;

updating, by one or more processors of the system, the corner grid point to obtain an updated grid in the parameterized space according to angles formed by the boundary edges and the border edge, the updated grid being obtained by maintaining fixed in the parameterized space other grid points corresponding to vertices along the outer edges of the block mesh;

determining, by the one or more processors, an updated mesh from the initial mesh according to the updated grid and the mapping relationship to reduce a difference between the angles formed by the boundary edges and the border edge; and generating, by the one or more processors, a final mesh representing the flow domain for simulating a physical characteristic of the physical object.

2. The computer-implemented method of claim 1, wherein the initial mesh includes block-structured embedded meshes within a topology of the flow domain, wherein the topology includes a plurality of topology faces meeting at the corner of the surface, and wherein the border edge is a topology edge extending from the corner vertex between the plurality of topology faces.

3. The computer-implemented method of claim 1, wherein the grid includes a block grid corresponding to the block mesh, wherein the block grid has border grid points corresponding to the vertices of the outer edges of the block mesh, wherein the block grid has interior grid points corresponding to interior vertices of the block mesh, and wherein the interior grid points are linearly interpolated between the border grid points.

4. The computer-implemented method of claim 1, wherein updating the corner grid point includes moving the corner grid point in the grid without moving the corner vertex in the updated mesh.

5. The computer-implemented method of claim 1, wherein determining the updated mesh equalizes the angles formed by the boundary edges and the border edge.

6. The computer-implemented method of claim 1, wherein the mesh includes a plurality of secondary block meshes connected with the block mesh in a chain between the corner vertex for the corner of the surface and a boundary vertex for a boundary of a second surface of the physical object, wherein the chain corresponds to a chain grid of the grid, wherein the chain grid includes the corner grid point, an end grid point corresponding to the boundary vertex, and a plurality of chain grid points linearly interpolated between the corner grid point and the end grid point.

7. The computer-implemented method of claim 1, wherein the initial mesh has a plurality of face vertices along boundary edges of the surface between a first surface location and a second surface location, wherein the updated mesh includes face edges extending from respective face vertices, and wherein angles of the face edges relative to the boundary edges are based on a proximity of the respective face vertices to the first surface location or the second surface location.

8. The computer-implemented method of claim 1, wherein the updated mesh includes a mesh vertex connecting mesh edges having edge arclengths based on a number and a type of the mesh edges.

9. A non-transitory computer-readable medium storing instructions executable by one or more processors of a system to cause the system to perform a method, comprising:

receiving, by a memory of the system, an initial mesh representing a flow domain around a surface of a physical object, wherein the initial mesh has a block mesh for a corner of the surface, wherein the block mesh includes a corner vertex, two boundary vertices, and a border vertex along outer edges of the block mesh, wherein boundary edges of the outer edges connect the two boundary vertices to the corner vertex for boundaries of the flow domain around the corner of the surface, wherein a border edge connects the corner vertex to the border vertex, wherein the initial mesh corresponds to a grid in a parameterized space according to a mapping relationship, and wherein the corner vertex of the initial mesh corresponds to a corner grid point of the grid;

updating, by one or more processors of the system, the corner grid point to obtain an updated grid in the parameterized space according to angles formed by the boundary edges and the border edge, the updated grid being obtained by maintaining fixed in the parameterized space other grid points corresponding to vertices along the outer edges of the block mesh;

determining, by the one or more processors, an updated mesh from the initial mesh according to the updated grid and the mapping relationship to reduce a difference between the angles formed by the boundary edges and the border edge; and generating, by the one or more processors, a final mesh representing the flow domain for simulating a physical characteristic of the physical object.

10. The non-transitory computer-readable medium of claim 9, wherein the initial mesh includes block-structured embedded meshes within a topology of the flow domain, wherein the topology includes a plurality of topology faces meeting at the corner of the surface, and wherein the border edge is a topology edge extending from the corner vertex between the plurality of topology faces.

11. The non-transitory computer-readable medium of claim 9, wherein the grid includes a block grid corresponding to the block mesh, wherein the block grid has border grid points corresponding to the vertices of the outer edges of the block mesh, wherein the block grid has interior grid points corresponding to interior vertices of the block mesh, and wherein the interior grid points are linearly interpolated between the border grid points.

12. The non-transitory computer-readable medium of claim 9, wherein updating the corner grid point includes moving the corner grid point in the grid without moving the corner vertex in the updated mesh.

13. The non-transitory computer-readable medium of claim 9, wherein the mesh includes a plurality of secondary block meshes connected with the block mesh in a chain between the corner vertex for the corner of the surface and a boundary vertex for a boundary of a second surface of the physical object, wherein the chain corresponds to a chain grid of the grid, wherein the chain grid includes the corner grid point, an end grid point corresponding to the boundary vertex, and a plurality of chain grid points linearly interpolated between the corner grid point and the end grid point.

14. The non-transitory computer-readable medium of claim 9, wherein the initial mesh has a plurality of face vertices along boundary edges of the surface between a first surface location and a second surface location, wherein the updated mesh includes face edges extending from respective face vertices, and wherein angles of the face edges relative to the boundary edges are based on a proximity of the respective face vertices to the first surface location or the second surface location.

15. A system, comprising:

a memory to receive an initial mesh representing a flow domain around a surface of a physical object, wherein the initial mesh has a block mesh for a corner of the surface, wherein the block mesh includes a corner vertex, two boundary vertices, and a border vertex along outer edges of the block mesh, wherein boundary edges of the outer edges connect the two boundary vertices to the corner vertex for boundaries of the flow domain around the corner of the surface, wherein a border edge connects the corner vertex to the border vertex, wherein the initial mesh corresponds to a grid in a parameterized space according to a mapping relationship, and wherein the corner vertex of the initial mesh corresponds to a corner grid point of the grid; and one or more processors to:

update the corner grid point to obtain an updated grid in the parameterized space according to angles formed by the boundary edges and the border edge, the updated grid being obtained by maintaining fixed in the parameterized space other grid points corresponding to vertices along the outer edges of the block mesh, determine an updated mesh from the initial mesh according to the updated grid and the mapping relationship to reduce a difference between the angles formed by the boundary edges and the border edge, and generate a final mesh representing the flow domain for simulating a physical characteristic of the physical object.

16. The system of claim 15, wherein the initial mesh includes block-structured embedded meshes within a topology of the flow domain, wherein the topology includes a plurality of topology faces meeting at the corner of the surface, and wherein the border edge is a topology edge extending from the corner vertex between the plurality of topology faces.

17. The system of claim 15, wherein the grid includes a block grid corresponding to the block mesh, wherein the block grid has border grid points corresponding to the vertices of the outer edges of the block mesh, wherein the block grid has interior grid points corresponding to interior vertices of the block mesh, and wherein the interior grid points are linearly interpolated between the border grid points.

18. The system of claim 15, wherein updating the corner grid point includes moving the corner grid point in the grid without moving the corner vertex in the updated mesh.

19. The system of claim 15, wherein the mesh includes a plurality of secondary block meshes connected with the block mesh in a chain between the corner vertex for the corner of the surface and a boundary vertex for a boundary of a second surface of the physical object, wherein the chain corresponds to a chain grid of the grid, wherein the chain grid includes the corner grid point, an end grid point corresponding to the boundary vertex, and a plurality of chain grid points linearly interpolated between the corner grid point and the end grid point.

20. The system of claim 15, wherein the initial mesh has a plurality of face vertices along boundary edges of the surface between a first surface location and a second surface location, wherein the updated mesh includes face edges extending from respective face vertices, and wherein angles of the face edges relative to the boundary edges are based on a proximity of the respective face vertices to the first surface location or the second surface location.

\* \* \* \* \*